US012444358B2

(12) United States Patent
An et al.

(10) Patent No.: US 12,444,358 B2
(45) Date of Patent: Oct. 14, 2025

(54) DISPLAY DEVICE AND METHOD OF OPERATING A DISPLAY DEVICE THAT PERFORMS A SENSING OPERATION ON AT LEAST ONE PIXEL IN A BLANK PERIOD OF A FRAME PERIOD

(71) Applicant: Samsung Display Co., Ltd., Yongin-Si (KR)

(72) Inventors: Jungeon An, Yongin-si (KR); Kihyun Pyun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 29 days.

(21) Appl. No.: 18/383,048

(22) Filed: Oct. 24, 2023

(65) Prior Publication Data

US 2024/0221647 A1 Jul. 4, 2024

(30) Foreign Application Priority Data

Jan. 2, 2023 (KR) ........................ 10-2023-0000126

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01); *G09G 2300/0842* (2013.01); *G09G 2320/0233* (2013.01); *G09G 2320/043* (2013.01)

(58) Field of Classification Search
None
See application file for complete search history.

(56) References Cited

U.S. PATENT DOCUMENTS

| | | | | |
|---|---|---|---|---|
| 9,111,489 B2 | | 8/2015 | Park et al. | |
| 11,741,878 B2 | | 8/2023 | Kim et al. | |
| 2014/0176400 A1 | * | 6/2014 | Park | G09G 3/3233 345/76 |
| 2015/0187268 A1 | * | 7/2015 | Tani | G09G 3/3233 345/77 |
| 2020/0051499 A1 | * | 2/2020 | Chung | G09G 5/377 |
| 2021/0104195 A1 | * | 4/2021 | Choi | G09G 3/3258 |
| 2023/0206842 A1 | * | 6/2023 | Park | G09G 3/3233 345/212 |

FOREIGN PATENT DOCUMENTS

| | | |
|---|---|---|
| KR | 10-2033374 B1 | 10/2019 |
| KR | 10-2022-0118599 A | 8/2022 |

* cited by examiner

*Primary Examiner* — Kirk W Hermann
(74) *Attorney, Agent, or Firm* — Innovation Counsel LLP

(57) ABSTRACT

A display device includes a display panel including pixels, and a panel driver configured to sequentially apply data voltages to the pixels on a row basis in an active period of a frame period, and to perform a sensing operation on at least one pixel of the pixels in a blank period of the frame period. Within the blank period, the panel driver applies a pre-charge data voltage to the at least one pixel after the sensing operation, and applies a previous data voltage to the at least one pixel after a predetermined time from a time point at which the pre-charge data voltage is applied.

18 Claims, 15 Drawing Sheets

DISPLAY DEVICE AND METHOD OF OPERATING A DISPLAY DEVICE THAT PERFORMS A SENSING OPERATION ON AT LEAST ONE PIXEL IN A BLANK PERIOD OF A FRAME PERIOD

CROSS-REFERENCE TO RELATED APPLICATION(S)

This application claims priority under 35 USC § 119 to Korean Patent Application No. 10-2023-0000126, filed on Jan. 2, 2023 in the Korean Intellectual Property Office (KIPO), the content of which is herein incorporated by reference in its entirety.

BACKGROUND

1. Field

Embodiments of the present inventive concept relate to a display device, and more particularly to a display device performing a sensing operation, and a method of operating the display device.

2. Description of the Related Art

Even when a plurality of pixels included in a display device, such as an organic light emitting diode (OLED) display device, is manufactured by the same process, driving transistors of the plurality of pixels may have different driving characteristics, e.g., different mobility and/or different threshold voltages, from each other due to a process variation, or the like. Thus, the plurality of pixels may emit light with different luminance. Further, as the display device operates over time, the plurality of pixels may be degraded, and the driving characteristics of the driving transistors may be degraded.

To compensate for non-uniformity of luminance and for the degradation, the display device may perform a sensing operation that senses the driving characteristics of the driving transistors of the plurality of pixels. In particular, to sense the driving characteristics of the driving transistors while the display device operates, a real-time sensing operation that senses the driving characteristic of at least one pixel in a blank period of each frame period may be performed.

SUMMARY

Some embodiments provide a display device capable of preventing luminance of a pixel on which a sensing operation is performed in a blank period from being increased.

Some embodiments provide a method of operating a display device capable of preventing luminance of a pixel on which a sensing operation is performed in a blank period from being increased.

According to embodiments, there is provided a display device including a display panel including pixels, and a panel driver configured to sequentially apply data voltages to the pixels on a row basis in an active period of a frame period, and to perform a sensing operation on at least one pixel of the pixels in a blank period of the frame period. Within the blank period, the panel driver applies a pre-charge data voltage to the at least one pixel after the sensing operation, and applies a previous data voltage to the at least one pixel after a predetermined time from a time point at which the pre-charge data voltage is applied.

In embodiments, a gate-source voltage of a driving transistor of the at least one pixel after the previous data voltage is applied within the blank period may be equal to a gate-source voltage of the driving transistor of the at least one pixel in the active period.

In embodiments, the predetermined time may correspond to a blank emission period in which the at least one pixel emits light within the blank period.

In embodiments, the pre-charge data voltage may be higher than a maximum gray data voltage.

In embodiments, the previous data voltage may be a data voltage that is applied to the at least one pixel in the active period.

In embodiments, the at least one pixel may include a driving transistor, a scan transistor, a sensing transistor, a storage capacitor, and a light emitting element. The driving transistor includes a gate coupled to a gate node, a first terminal coupled to a line having a first power supply voltage, and a second terminal coupled to a source node. The scan transistor includes a gate receiving a scan signal, a first terminal coupled to a data line, and a second terminal coupled to the gate node. The sensing transistor includes a gate receiving a sensing signal, a first terminal coupled to a sensing line, and a second terminal coupled to the source node. The storage capacitor includes a first electrode coupled to the gate node, and a second electrode coupled to the source node. The light emitting element includes an anode coupled to the source node, and a cathode coupled to a line having a second power supply voltage.

In embodiments, within the predetermined time, the driving transistor may be turned on, and a voltage of the source node may be increased to a voltage greater than or equal to a threshold voltage of the light emitting element.

In embodiments, within the predetermined time, a parasitic capacitor of the light emitting element may be charged.

In embodiments, the blank period may include a sensing initialization period in which a sensing data voltage is applied to the gate node, and an initialization voltage is applied to the source node, a sensing period in which the sensing operation is performed, a pre-charge data application period in which the pre-charge data voltage is applied to the gate node, and the initialization voltage is applied to the source node, a blank emission period in which the light emitting element emits light, and a recovery data application period in which the previous data voltage is applied to the gate node, and the initialization voltage is applied to the source node.

In embodiments, in the sensing initialization period, the scan signal may have an on-level, the sensing signal may have the on-level, the scan transistor may be turned on in response to the scan signal having the on-level, and may transfer the sensing data voltage of the data line to the gate node, and the sensing transistor may be turned on in response to the sensing signal having the on-level, and may transfer the initialization voltage of the sensing line to the source node.

In embodiments, in the sensing period, the scan signal may have an off-level, the sensing signal may have an on-level, the scan transistor may be turned off in response to the scan signal having the off-level, the sensing transistor may be turned on in response to the sensing signal having the on-level, and may couple the source node to the sensing line, the driving transistor may generate a sensing current based on the sensing data voltage, and the panel driver may sense the sensing current through the sensing line.

In embodiments, in the pre-charge data application period, the scan signal may have an on-level, the sensing signal may have the on-level, the scan transistor may be turned on in response to the scan signal having the on-level, and may transfer the pre-charge data voltage of the data line to the gate node, and the sensing transistor may be turned on in response to the sensing signal having the on-level, and may transfer the initialization voltage of the sensing line to the source node.

In embodiments, in the blank emission period, the scan signal may have an off-level, the sensing signal may have the off-level, the scan transistor may be turned off in response to the scan signal having the off-level, the sensing transistor may be turned off in response to the sensing signal having the off-level, the driving transistor may generate a driving current based on the pre-charge data voltage, a voltage of the source node may be increased to a voltage greater than or equal to a threshold voltage of the light emitting element, and a voltage of the gate node may be increased as the voltage of the source node is increased.

In embodiments, in the recovery data application period, the scan signal may have an on-level, the sensing signal may have the on-level, the scan transistor may be turned on in response to the scan signal having the on-level, and may transfer the previous data voltage of the data line to the gate node, and the sensing transistor may be turned on in response to the sensing signal having the on-level, and may transfer the initialization voltage of the sensing line to the source node.

In embodiments, a voltage difference between a voltage of the gate node and a voltage of the source node after the recovery data application period may be equal to a voltage difference between the voltage of the gate node and the voltage of the source node in the active period.

According to embodiments, there is provided a method of operating a display device. In the method, data voltages are sequentially applied to pixels on a row basis in an active period of a frame period, a sensing operation is performed on at least one pixel of the pixels in a blank period of the frame period, a pre-charge data voltage is applied to the at least one pixel after the sensing operation within the blank period, and a previous data voltage is applied to the at least one pixel after a predetermined time from a time point at which the pre-charge data voltage is applied within the blank period.

In embodiments, a gate-source voltage of a driving transistor of the at least one pixel after the previous data voltage is applied within the blank period may be equal to a gate-source voltage of the driving transistor of the at least one pixel in the active period.

In embodiments, the predetermined time may correspond to a blank emission period in which the at least one pixel emits light within the blank period.

In embodiments, the pre-charge data voltage may be higher than a maximum gray data voltage.

In embodiments, the previous data voltage may be a data voltage that is applied to the at least one pixel in the active period.

As described above, in a display device and a method of operating the display device according to embodiments, a pre-charge data voltage may be applied to a pixel after a sensing operation for the pixel is performed in a blank period of a frame period, and a previous data voltage may be applied to the pixel after a predetermined time from a time point at which the pre-charge data voltage is applied. Accordingly, luminance of the pixel on which the sensing operation is performed in the blank period may be prevented from being increased.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
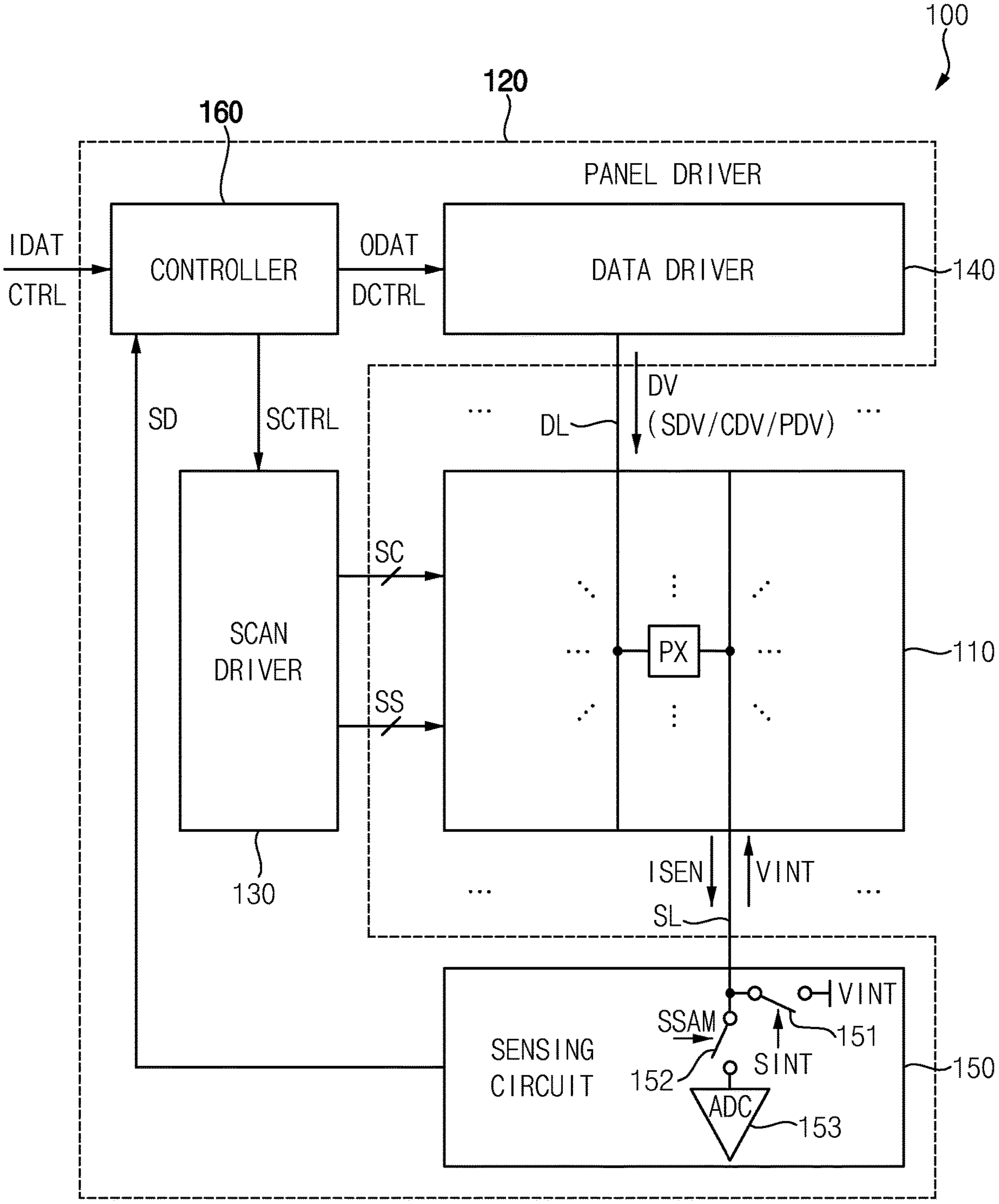
FIG. 1 is a block diagram illustrating a display device according to embodiments.
Figure 2:
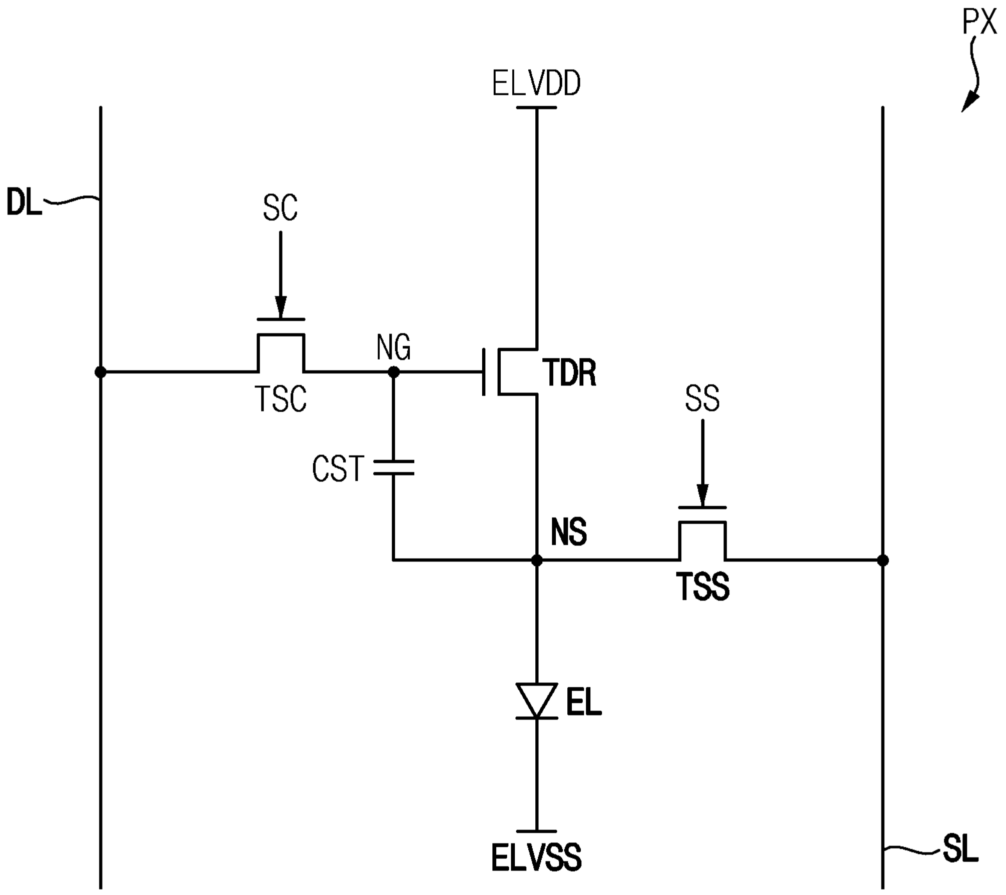
FIG. 2 is a circuit diagram illustrating an example of a pixel included in a display device according to embodiments.
Figure 3:
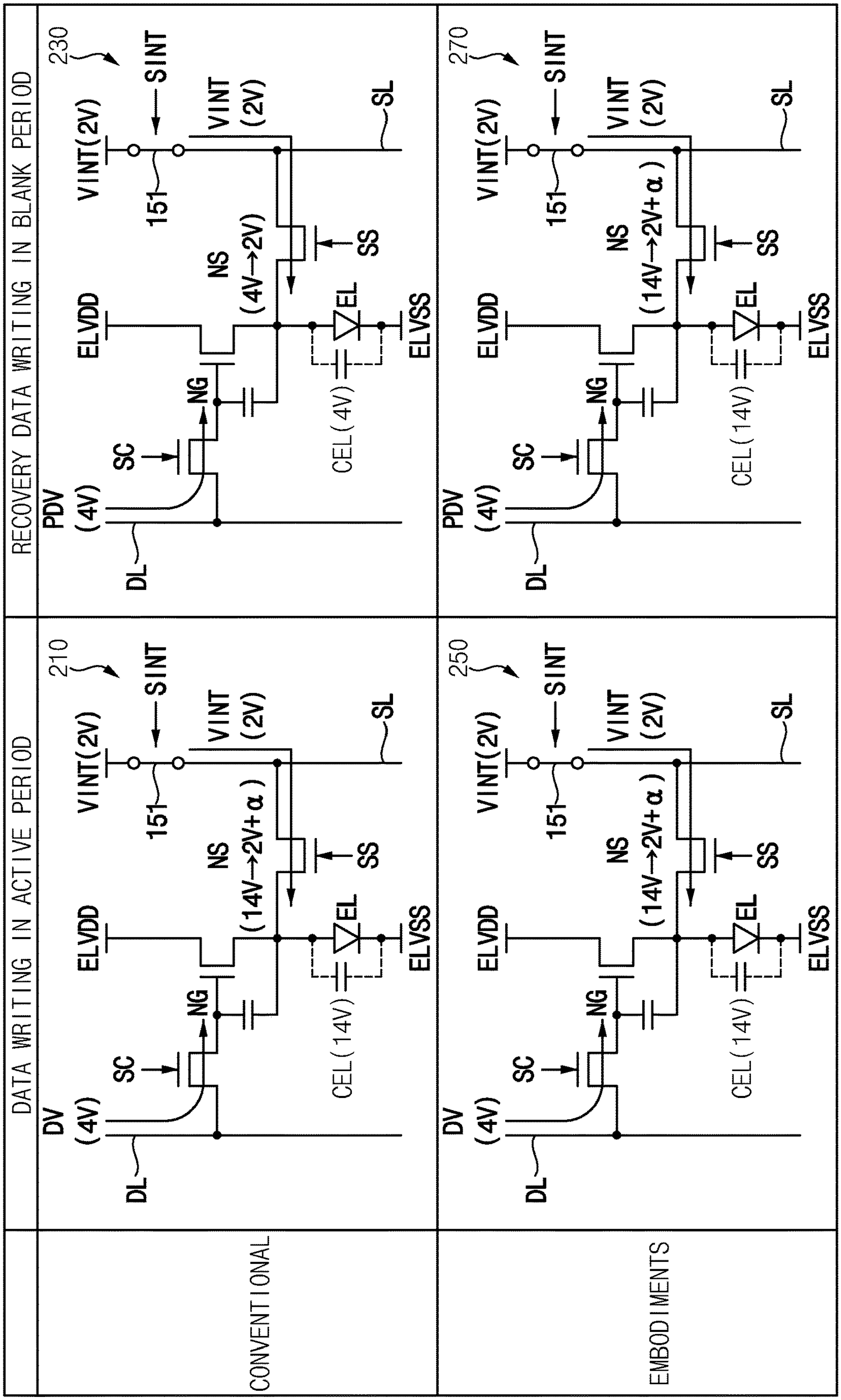
FIG. 3 is a diagram for describing an example of a pixel of a conventional display device in an active period and a blank period, and an example of a pixel of a display device in an active period and a blank period according to embodiments.

FIG. 1 is a block diagram illustrating a display device 100 according to embodiments. FIG. 2 is a circuit diagram illustrating an example of a pixel PX included in a display device according to embodiments. FIG. 3 is a diagram for describing an example of a pixel of a conventional display device in an active period and a blank period, and an example of a pixel of a display device in an active period and a blank period according to embodiments.

Referring to FIG. 1, the display device 100 according to embodiments may include a display panel 110 that includes pixels, and a panel driver 120 that drives the display panel 110. In some embodiments, the panel driver 120 may include a scan driver 130 that provides scan signals SC and sensing signals SS to the pixels PX, a data driver 140 coupled to the pixels PX through data lines DL, a sensing circuit 150 coupled to the pixels PX through sensing lines SL, and a controller 160 that controls the scan driver 130, the data driver 140 and the sensing circuit 150.

The display panel 110 may include the data lines DL, the sensing lines SL, and the pixels PX coupled to the data lines DL and the sensing lines SL. The display panel 110 may further include scan signal lines for providing the scan signals SC to the pixels PX, and sensing signal lines for providing the sensing signals SS to the pixels PX. In some embodiments, each pixel PX may include a light emitting element, and the display panel 110 may be a light emitting display panel. For example, the display panel 110 may be, but is not limited to, an organic light emitting diode (OLED) display panel, a quantum dot (QD) display panel, or the like.

For example, as illustrated in FIG. 2, each pixel PX may include a driving transistor TDR, a scan transistor TSC, a sensing transistor TSS, a storage capacitor CST and a light emitting element EL.

The storage capacitor CST may store a data voltage DV (or a sensing data voltage SDV, a pre-charge data voltage CDV or a previous data voltage PDV) transferred through the data line DL. In some embodiments, the storage capacitor CST may include a first electrode coupled to a gate node NG, and a second electrode coupled to a source node NS.

The scan transistor TSC may couple the data line DL to the gate node NG in response to the scan signal SC. Thus, the scan transistor TSC may transfer the data voltage DV of the data line DL to the gate node NG in response to the scan signal SC. In some embodiments, the scan transistor TSC may include a gate receiving the scan signal SC, a first terminal coupled to the data line DL, and a second terminal coupled to the gate node NG.

The sensing transistor TSS may couple the sensing line SL to the source node NS in response to the sensing signal SS. In some embodiments, the sensing transistor TSS may include a gate receiving the sensing signal SS, a first terminal coupled to the sensing line SL, and a source coupled to the source node NS.

The driving transistor TDR may generate a driving current based on the data voltage DV stored in the storage capacitor CST. In some embodiments, the driving transistor TDR may include a gate coupled to the gate node NG, a first terminal, e.g., a drain, coupled to a line having a first power supply voltage ELVDD, e.g., a high power supply voltage, and a second terminal, e.g., a source, coupled to the source node NS.

The light emitting element EL may emit light in response to the driving current generated by the driving transistor TDR. According to embodiments, the light emitting element EL may be, but is not limited to, an OLED, a QD diode, or the like. In some embodiments, the light emitting element EL may include an anode coupled to the source node NS, and a cathode coupled to a line having a second power supply voltage ELVSS, e.g., a low power supply voltage.

Although FIG. 2 illustrates an example of the pixel PX, the pixel PX of the display device 100 according to embodiments is not limited to the example of FIG. 2.

The scan driver 130 may generate the scan signals SC and the sensing signals SS based on a scan control signal SCTRL from the controller 160, and may sequentially provide the scan signals SC and the sensing signals SS to the pixels PX on a row basis in an active period of a frame period. Thus, in the active period, the scan driver 130 may substantially simultaneously provide the scan signal SC and the sensing signal SS to a current row of the pixels PX, and then may substantially simultaneously provide the scan signal SC and the sensing signal SS to the next row of the pixels PX. In some embodiments, the scan control signal SCTRL may include, but is not limited to, a start signal and a clock signal. In some embodiments, the scan driver 130 may be integrated or formed in a peripheral portion of the display panel 110. In other embodiments, the scan driver 130 may be implemented with one or more integrated circuits.

The data driver 140 may generate the data voltages DV based on output image data ODAT and a data control signal DCTRL received from the controller 160, and may provide the data voltages DV to the pixels PX in the active period. Since the scan signals SC and the sensing signals SS are sequentially provided to the pixels PX on the row basis in the active period, the data driver 140 may sequentially apply the data voltages DV to the pixels PX on the row basis in the active period. In some embodiments, the data control signal DCTRL may include, but is not limited to, a data enable signal, a horizontal start signal and a load signal.

The data driver 140 may apply the sensing data voltage SDV to at least one pixel PX on which a sensing operation is performed in a blank period of the frame period. Further, within the blank period, the data driver 140 may apply the pre-charge data voltage CDV to the at least one pixel PX after the sensing operation is performed, and may apply the previous data voltage PDV to the at least one pixel PX after a predetermined time from a time point at which the pre-charge data voltage CDV is applied. In some embodiments, the pre-charge data voltage CDV may be higher than a maximum gray data voltage, e.g., the data voltage DV corresponding to a 255-gray level. For example, the maximum gray data voltage may be, but is not limited to, about 8V, and the pre-charge data voltage CDV may be, but is not limited to, about 10V. Further, in some embodiments, the previous data voltage PDV may be a data voltage DV that is applied to the at least one pixel PX in the active period immediately before the sensing operation is performed. For example, in a case where a data voltage DV corresponding to a 48-gray level is applied to the at least one pixel PX in the active period, within the blank period after the active period, the pre-charge data voltage CDV may be first applied to the at least one pixel PX after the sensing operation is performed on the at least one pixel PX, and then the data voltage DV corresponding to the 48-gray level may be applied as the previous data voltage PDV to the at least one pixel PX after the predetermined time.

In some embodiments, the data driver 140 may be implemented with one or more integrated circuits. In other embodiments, the data driver 140 and the controller 160 may be implemented with a single integrated circuit, and the single integrated circuit may be referred to as a timing controller embedded data driver (TED) integrated circuit.

The sensing circuit 150 may generate sensing data SD by sensing the at least one pixel PX through the sensing line SL. For example, the sensing circuit 150 may sense a driving characteristic, e.g., a mobility and/or a threshold voltage, of the driving transistor TDR by measuring a sensing current (or a sensing voltage) of the driving transistor TDR of the at least one pixel PX through the sensing line SL. In some embodiments, the sensing circuit 150 may include, but is not limited to, an initialization switch 151 that provides an initialization voltage VINT to the sensing line SL in response to an initialization signal SINT, a sampling switch 152 that couples the sensing line SL to an analog-to-digital converter (ADC) 153 in response to a sampling signal SSAM, and the ADC 153 that generates the sensing data SD based on the sensing current (or the sensing voltage) of the driving transistor TDR received through the sensing line SL. In some embodiments, the sensing circuit 150 may be implemented with a separate integrated circuit from an integrated circuit of the data driver 140. In other embodiments, the sensing circuit 150 may be included in the data driver 140, or may be included in the controller 160.

The controller 160, e.g., a timing controller (TCON), may receive input image data IDAT and a control signal CTRL from an external host processor, e.g., a graphics processing unit (GPU), an application processor (AP) or a graphics card. In some embodiments, the control signal CTRL may include, but is not limited to, a vertical synchronization signal, a horizontal synchronization signal, an input data enable signal, a master clock signal, etc. The controller 160 may generate the output image data ODAT by correcting the input image data IDAT based on the sensing data SD received from the sensing circuit 150. Further, the controller 160 may generate the data control signal DCTRL and the scan control signal SCTRL based on the control signal CTRL. The controller 160 may control an operation of the scan driver 130 by providing the scan control signal SCTRL to the scan driver 130, and may control an operation of the data driver 140 by providing the output image data ODAT and the data control signal DCTRL to the data driver 140.

In the display device 100 according to embodiments, the panel driver 120 may perform a sensing operation (or a real-time sensing operation) for at least one pixel PX of the display panel 110 in a blank period, e.g., a vertical blank period, of a frame period. In some embodiments, the panel driver 120 may perform the sensing operation on one row of the pixels PX in each blank period. For example, the panel driver 120 may sequentially perform the sensing operations for a plurality of pixel rows of the display panel 110 in a plurality of frame periods. Thus, in a case where the display panel 110 includes N pixel rows, the panel driver 120 may perform the sensing operations for the N pixel rows in N blank periods of N frame periods, respectively, where N is an integer greater than 1. In another example, the panel driver 120 may perform the sensing operation on one pixel row that is randomly selected in each frame period.

After the sensing operation for the at least one pixel PX is performed in the blank period, the previous data voltage PDV may be applied to the pixel PX in the blank period such that the pixel PX again emits light in an active period subsequent to the blank period. However, in a conventional display device, a voltage of the source node NS of the pixel PX when the data voltage DV is applied to the pixel PX (or when data writing is performed) in an active period before the blank period and the voltage of the source node NS of the pixel PX when the previous data voltage PDV is applied to the pixel PX (or when recovery data writing is performed) after the sensing operation is performed in the blank period may be different from each other, and thus a gate-source voltage of the driving transistor TDR after the recovery data writing in the blank period may be different from the gate-source voltage of the driving transistor TDR after the data writing in the active period.

For example, as illustrated in FIG. 3, when the data writing is initiated in the active period, since a pixel 210 of the conventional display device is in a light-emission state, the source node NS may have a voltage, e.g., about 14V, higher than a threshold voltage, e.g., about 12V, of the light emitting element EL, and a parasitic capacitor CEL of the light emitting element EL may be in a charged state to store the voltage of about 14V. To perform the data writing in the active period, the data voltage DV, e.g., of about 4V, may be applied to the gate node NG. Further, the initialization switch 151 may be turned on in response to the initialization signal SINT to provide the initialization voltage VINT, e.g., of about 2V, to the sensing line SL, and the initialization voltage VINT may be applied to the source node NS through the sensing line SL. Since, when the data writing is performed in the active period, the source node NS has the high voltage of about 14V, and the parasitic capacitor CEL of the light emitting element EL is in the charged state, after the data writing, the voltage of the source node NS may not be decreased to the initialization voltage VINT of about 2V, and the source node NS may have a voltage 2V+$\alpha$ where a certain voltage $\alpha$ is added to the initialization voltage VINT of about 2V. Accordingly, the gate-source voltage of the driving transistor TDR of the pixel 210 of the conventional display device after the data writing in the active period may be about 2V−$\alpha$.

However, when the recovery data writing is initiated after the sensing operation within the blank period, since a pixel 230 of the conventional display device is in a non-light-emission state, the source node NS may have a relatively low voltage, e.g., about 4V. To perform the recovery data writing in the blank period, the previous data voltage PDV substantially the same as the data voltage DV of about 4V in the active period may be applied to the gate node NG. Further, the initialization switch 151 may be turned on in response to the initialization signal SINT to provide the initialization voltage VINT of about 2V to the sensing line SL, and the initialization voltage VINT may be applied to the source node NS through the sensing line SL. Since the source node NS has the low voltage of about 4V when the recovery data writing is performed in the blank period, after the recovery data writing, the voltage of the source node NS may be decreased to the initialization voltage VINT of about 2V. Thus, in the conventional display device, although the gate-source voltage of the driving transistor TDR of the pixel 210 after the data writing in the active period is about 2V−$\alpha$, the gate-source voltage of the driving transistor TDR of the pixel 210 after the recovery data writing in the blank period may be about 2V. Accordingly, in the conventional display device, luminance of the pixel PX or the pixel row on which the sensing operation is performed in the blank period may be increased, and a horizontal bright line may be perceived.

However, in the display device 200 according to embodiments, within the blank period, the panel driver 120 may first apply the pre-charge data voltage CDV to the pixel PX on which the sensing operation is performed, and may apply the previous data voltage PDV to pixel PX after the predetermined time from the time point at which the pre-charge data voltage CDV is applied. If the pre-charge data voltage CDV is applied to the pixel PX, the driving transistor TDR may be turned on to generate a driving current based on the pre-charge data voltage CDV, and the light emitting element EL may emit light based on the driving current during the predetermined time. Further, within the predetermined time, if the driving transistor TDR is turned on to generate the driving current, the parasitic capacitor CEL of the light emitting element EL may be charged to store a voltage, e.g., about 14V, greater than or equal to the threshold voltage, e.g., about 12V, of the light emitting element EL, and the voltage of the source node NS may be increased to the voltage, e.g., about 14V, greater than or equal to the threshold voltage, e.g., about 12V, of the light emitting element EL. Thus, the voltage, e.g., about 14V, of the source node NS when the recovery data writing is initiated in the blank period may be substantially the same as the voltage, e.g., about 14V, of the source node NS when the data writing is initiated in the active period.

For example, as illustrated in FIG. 3, when the data writing is initiated in the active period, since a pixel 250 of the display device 100 according to embodiments is in the light-emission state, the source node NS may have the voltage, e.g., about 14V, higher than the threshold voltage, e.g., about 12V, of the light emitting element EL, and the parasitic capacitor CEL of the light emitting element EL may be in the charged state to store the voltage of about 14V. Thus, after the data writing, the voltage of the source node NS may not be decreased to the initialization voltage VINT of about 2V, and the source node NS may have the voltage 2V+α where the certain voltage α is added to the initialization voltage VINT of about 2V. Accordingly, the gate-source voltage of the driving transistor TDR of the pixel 250 of the display device 100 according to embodiments after the data writing in the active period may be about 2V−α.

Further, after the sensing operation is performed within the blank period, the pre-charge data voltage CDV may be applied to a pixel 270, the pixel 270 may emit light based on the pre-charge data voltage CDV, the source node NS may have the voltage, e.g., about 14V, higher than the threshold voltage, e.g., about 12V, of the light emitting element EL, and the parasitic capacitor CEL of the light emitting element EL may be charged to store the voltage of about 14V. Thereafter, if the recovery data writing that applies the previous data voltage PDV to the pixel 270 is performed, the voltage of the source node NS may not be decreased to the initialization voltage VINT of about 2V, and the source node NS may have the voltage 2V+α where the certain voltage α is added to the initialization voltage VINT of about 2V. Accordingly, the gate-source voltage of the driving transistor TDR of the pixel 270 of the display device 100 according to embodiments after the recovery data writing in the blank period may be about 2V−α. Thus, in the display device 100 according to embodiments, the gate-source voltage of the driving transistor TDR of the pixel 270 after the recovery data writing in the blank period may be substantially the same as the gate-source voltage of the driving transistor TDR of the pixel 250 after the data writing in the active period. Accordingly, in the display device 100 according to embodiments, luminance of the pixel PX or the pixel row on which the sensing operation is performed in the blank period may not be increased, and the horizontal bright line may be prevented.

As described above, in the display device 100 according to embodiments, the pre-charge data voltage CDV may be first applied to the pixel PX after the sensing operation is performed on the pixel PX, and the previous data voltage PDV may be applied to pixel PX after the predetermined time from the time point at which the pre-charge data voltage CDV is applied. By these operations, the voltage of the source node NS at a start time point of the recovery data writing (or applying the previous data voltage PDV) in the blank period may be substantially the same as the voltage of the source node NS at a start time point of the data writing in the active period. Thus, the gate-source voltage of the driving transistor TDR after the recovery data writing in the blank period may be substantially the same as the gate-source voltage of the driving transistor TDR after the data writing in the active period. Accordingly, in the display device 100 according to embodiments, the luminance of the pixel PX on which the sensing operation is performed in the blank period may be prevented from being increased.

Figure 4:
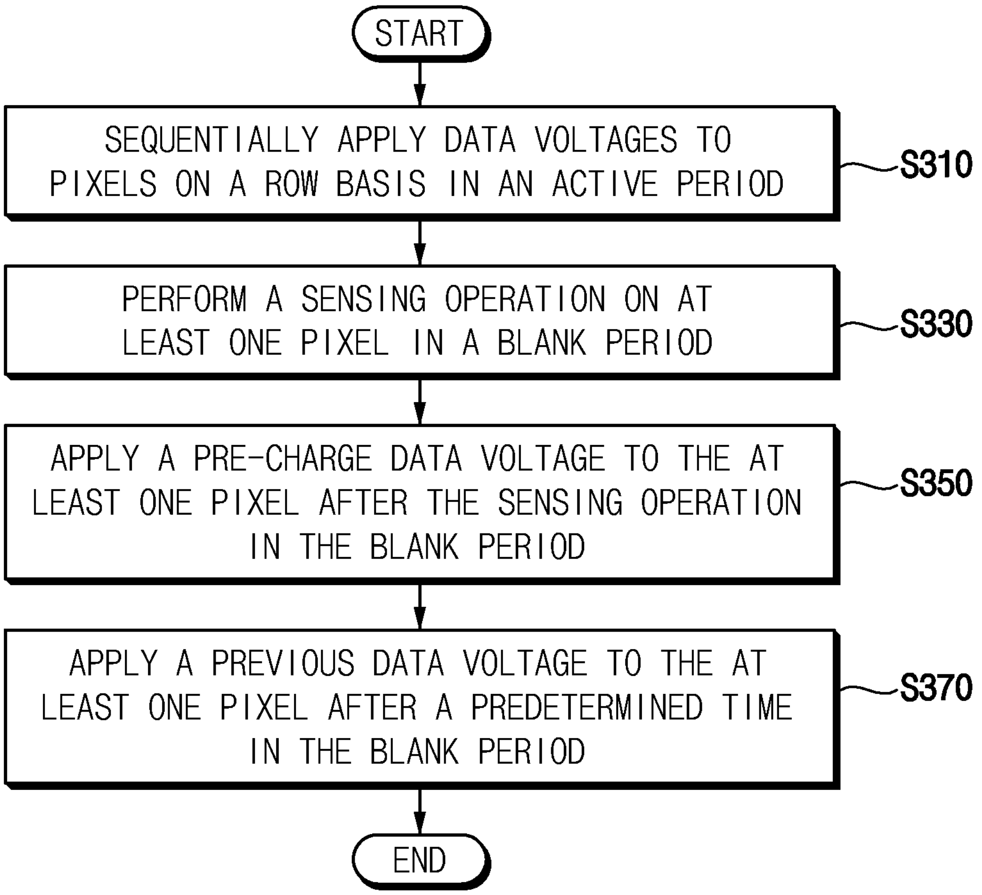
FIG. 4 is a flowchart illustrating a method of operating a display device according to embodiments.
Figure 5:
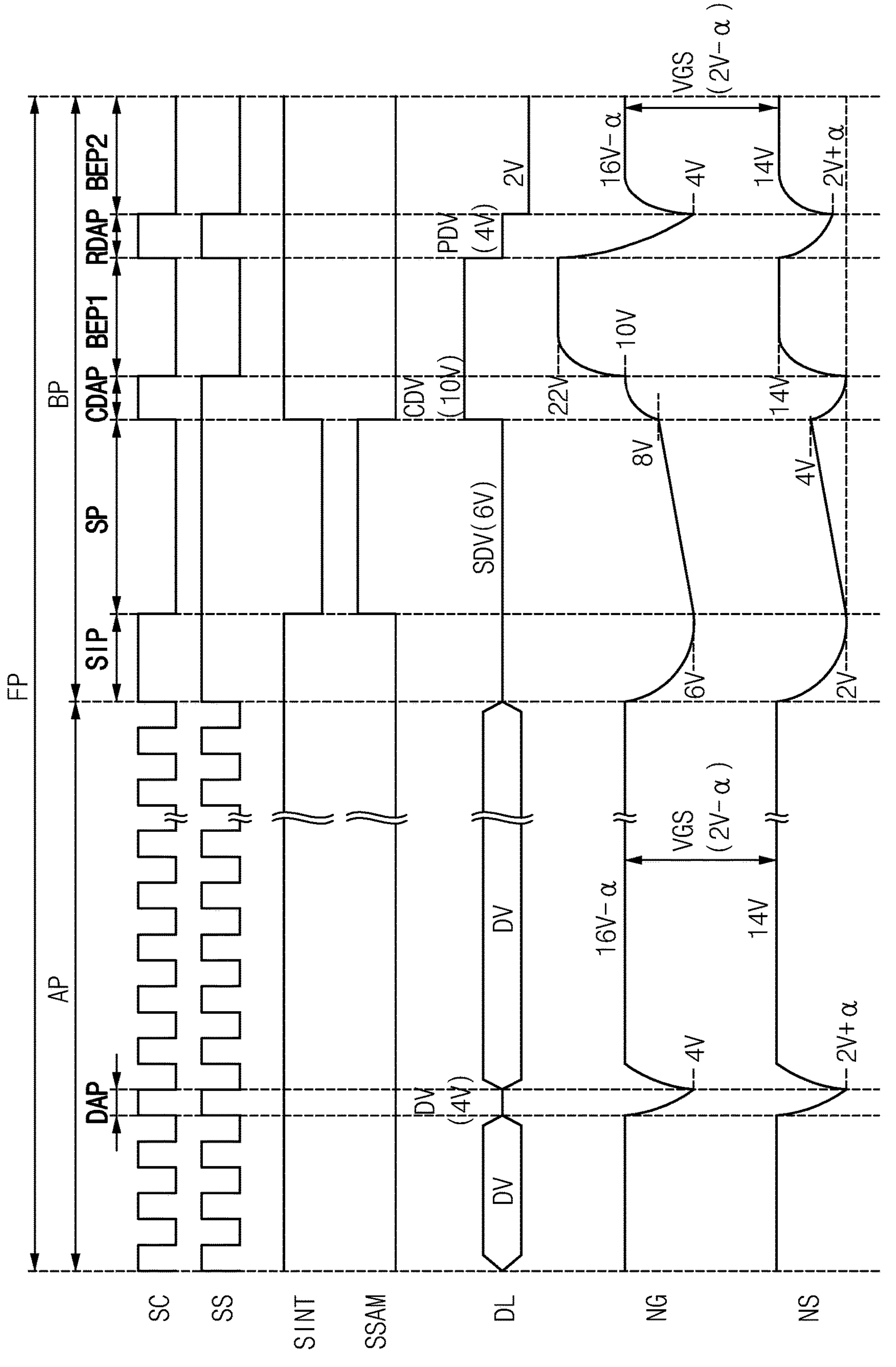
FIG. 5 is a timing diagram for describing an operation of a pixel on which a sensing operation is performed in a blank period in a display device according to embodiments.
Figure 6:
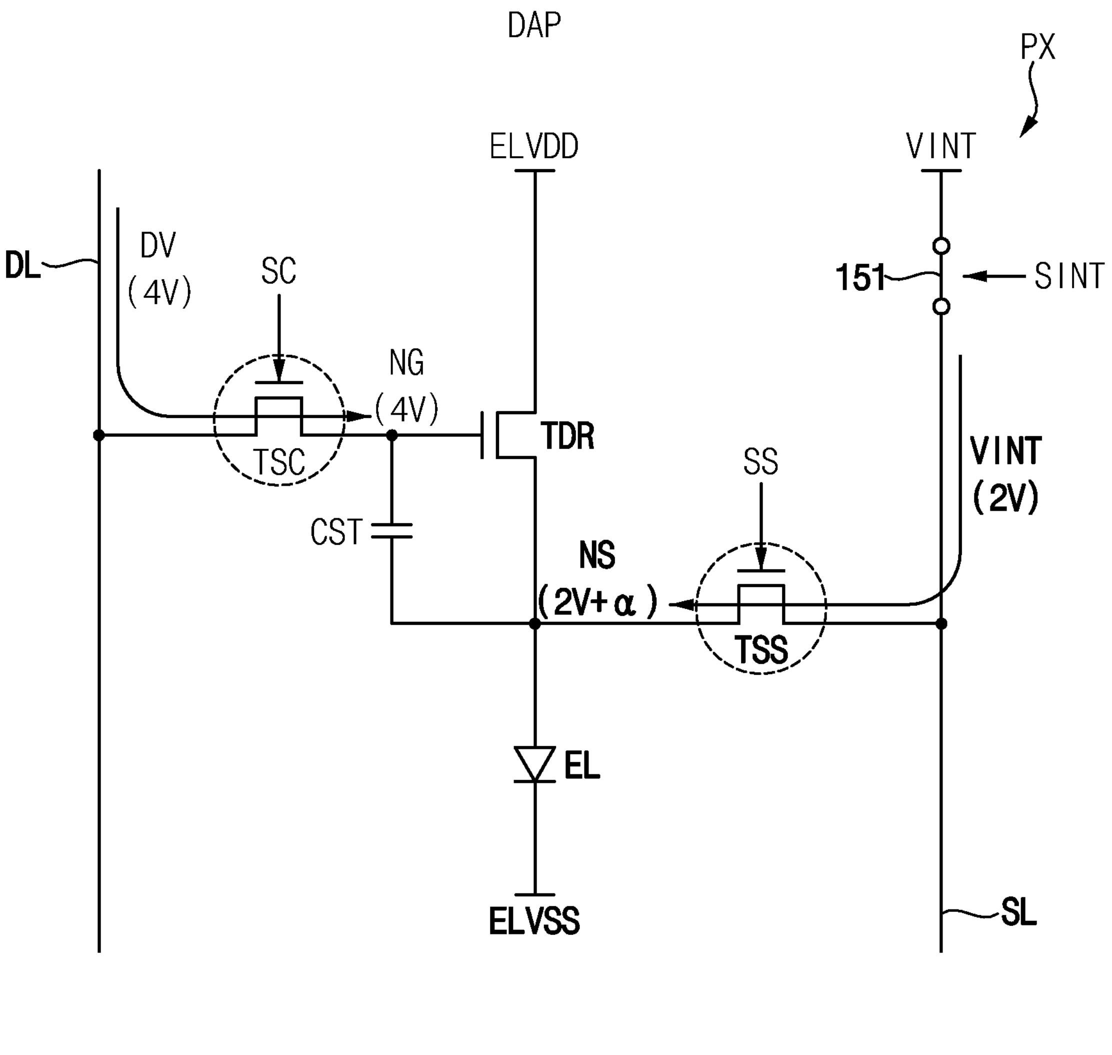
FIG. 6 is a circuit diagram for describing an example of an operation of a pixel in a data application period.
Figure 7:
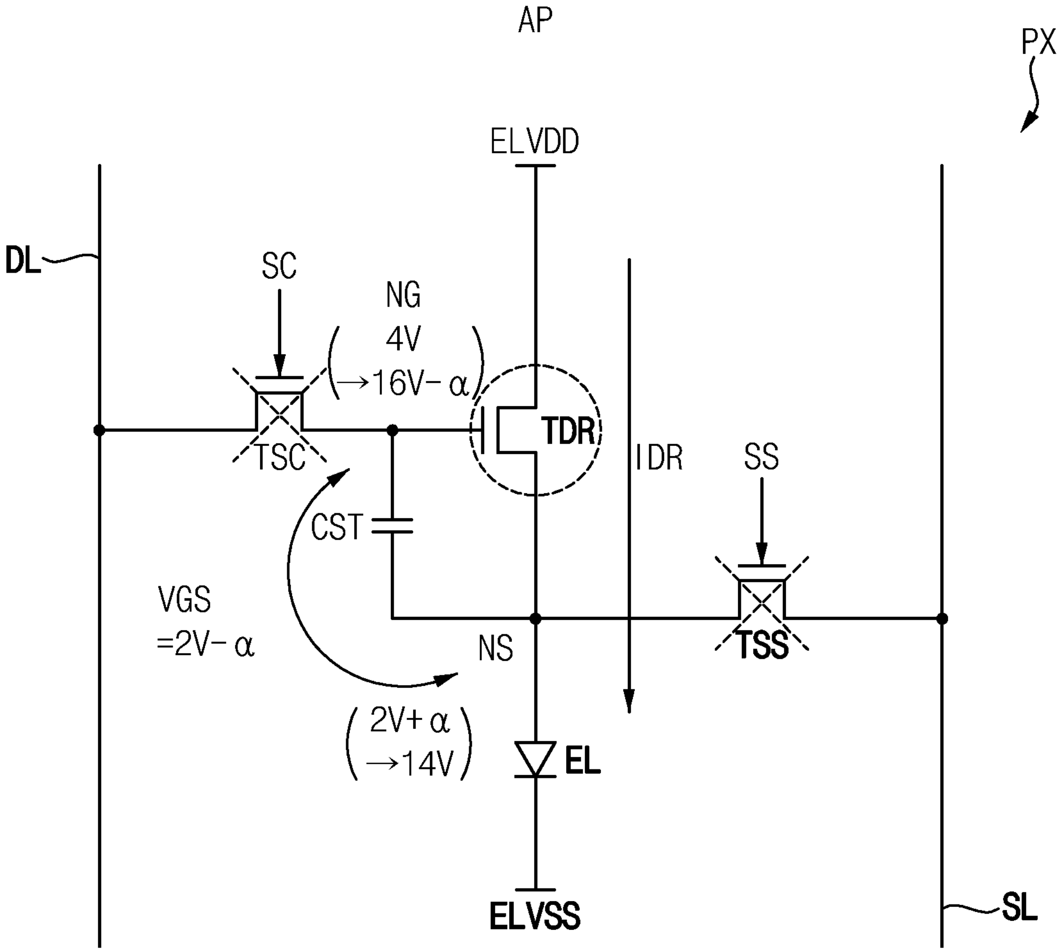
FIG. 7 is a circuit diagram for describing an example of an operation of a pixel in an active period after a data application period.
Figure 8:
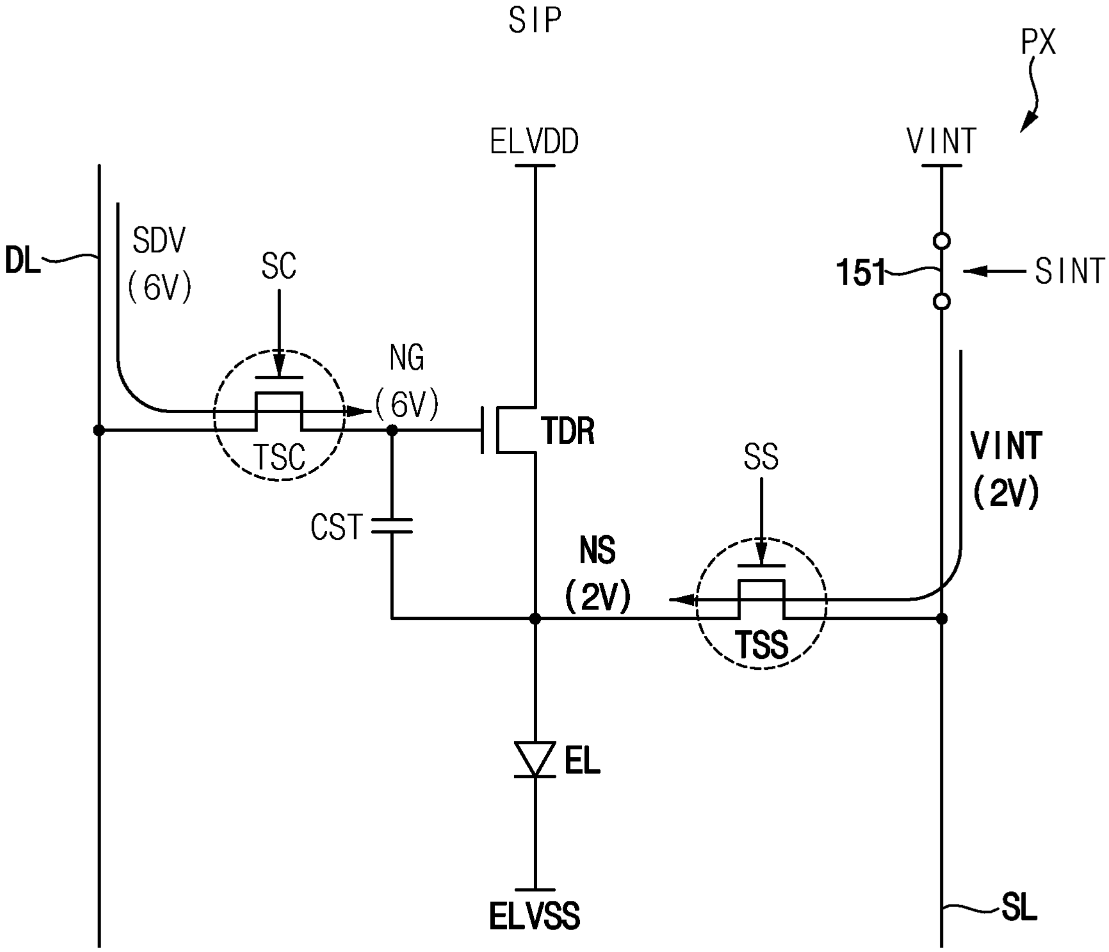
FIG. 8 is a circuit diagram for describing an example of an operation of a pixel in a sensing initialization period.
Figure 9:
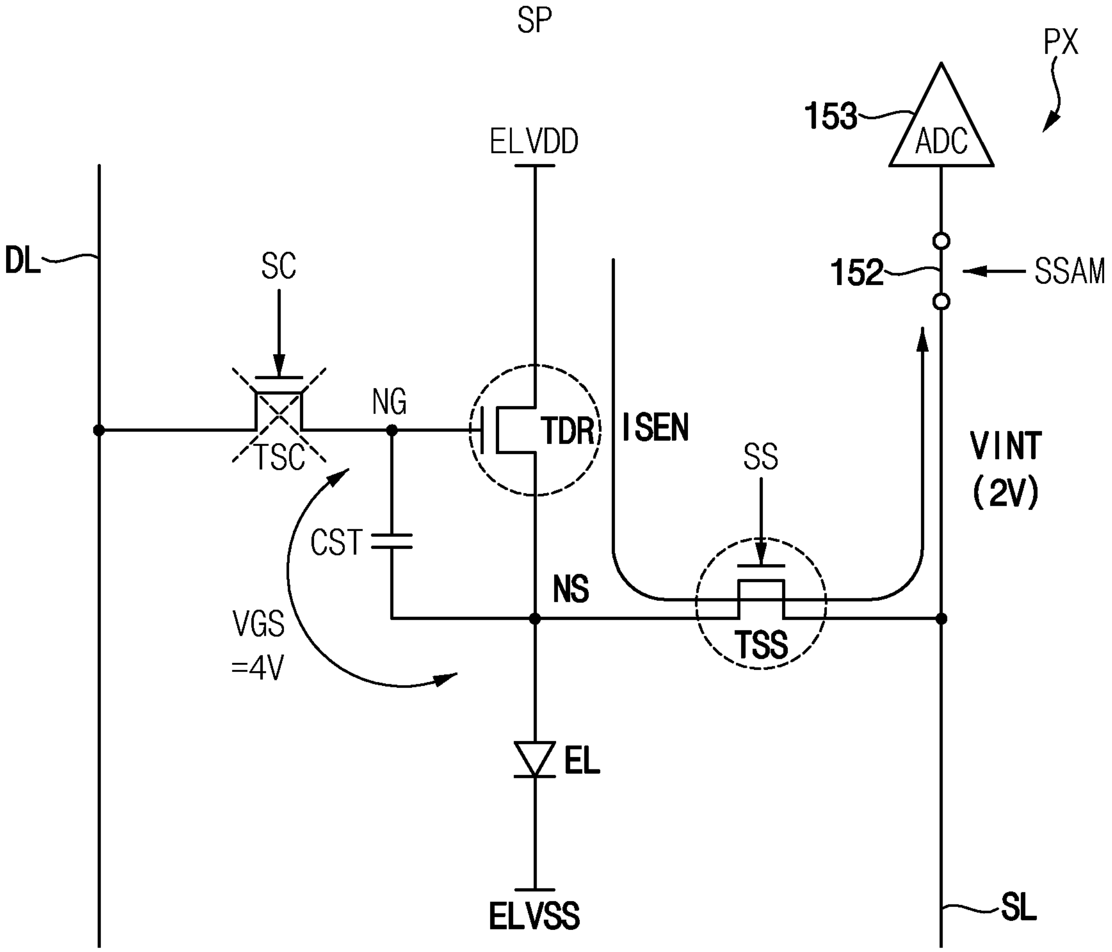
FIG. 9 is a circuit diagram for describing an example of an operation of a pixel in a sensing period.
Figure 10:
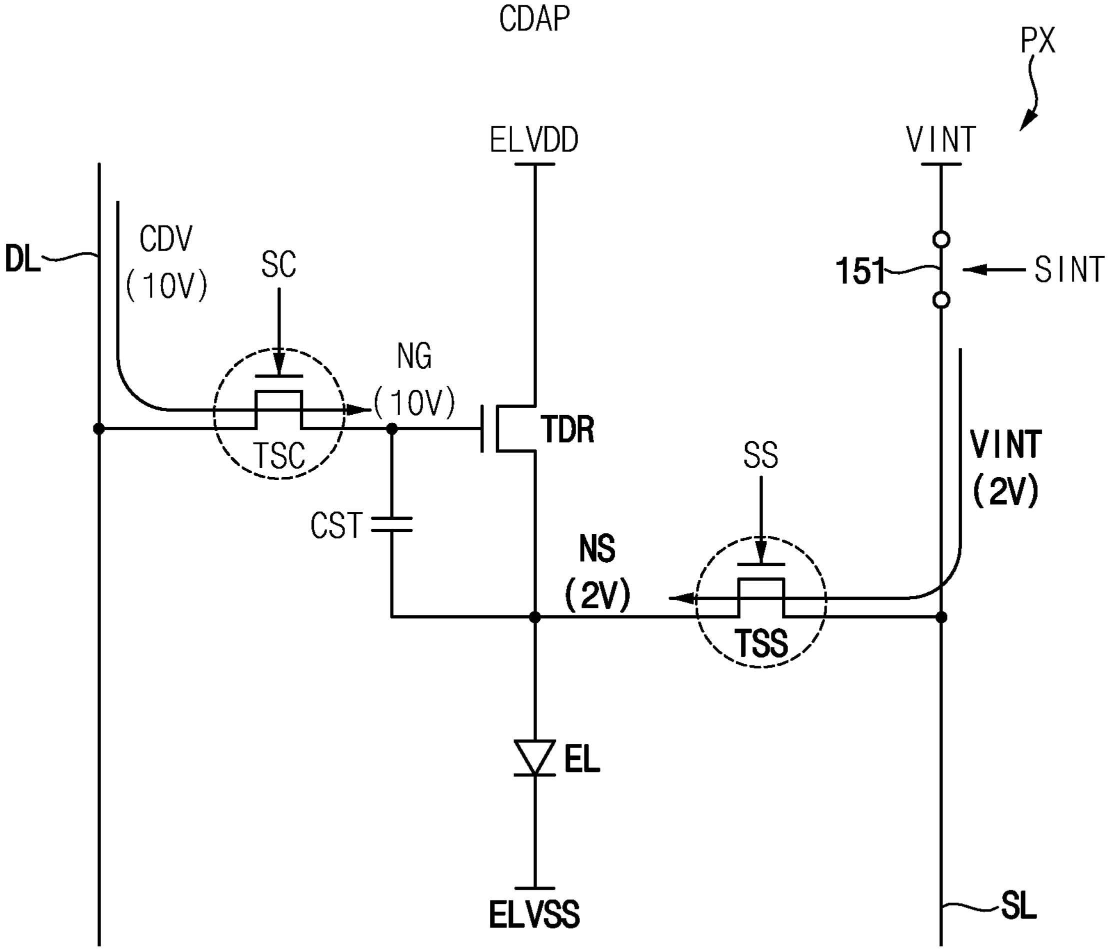
FIG. 10 is a circuit diagram for describing an example of an operation of a pixel in a pre-charge data application period.
Figure 11:
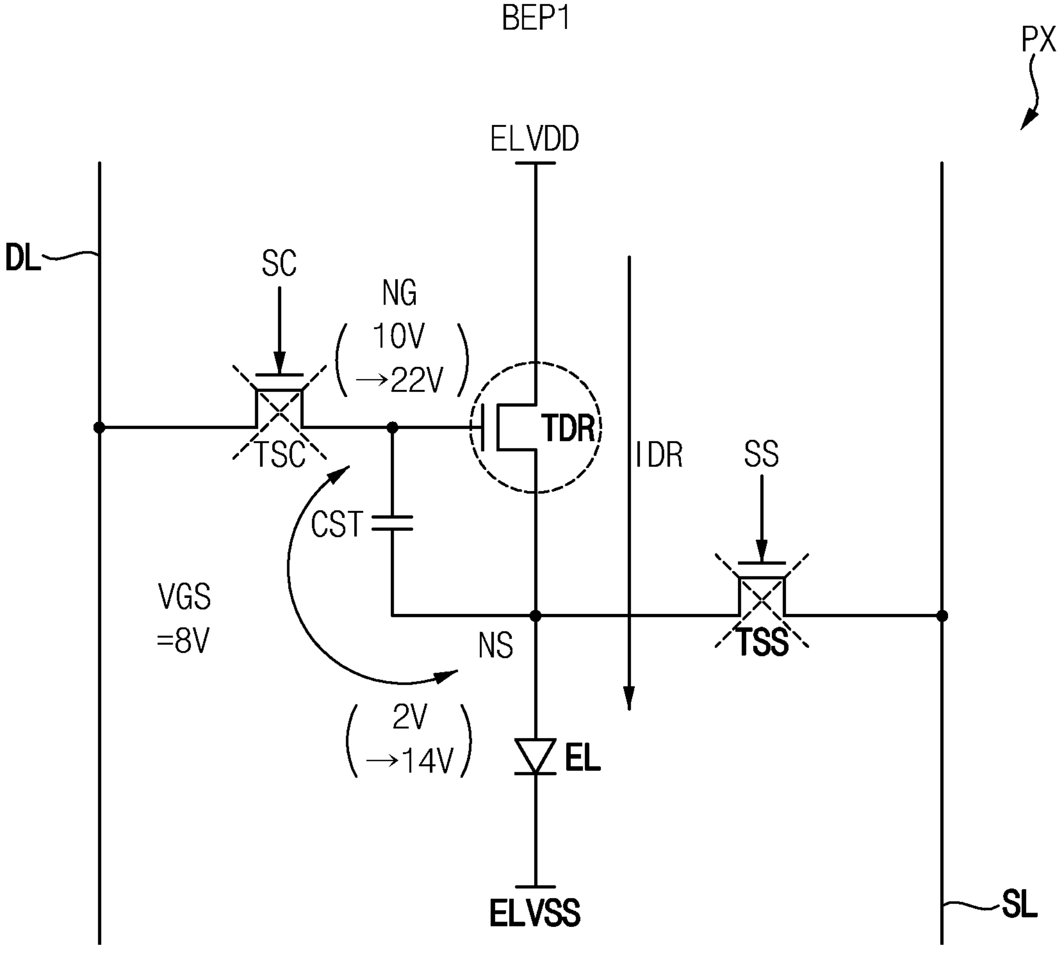
FIG. 11 is a circuit diagram for describing an example of an operation of a pixel in a blank emission period after a pre-charge data application period.
Figure 12:
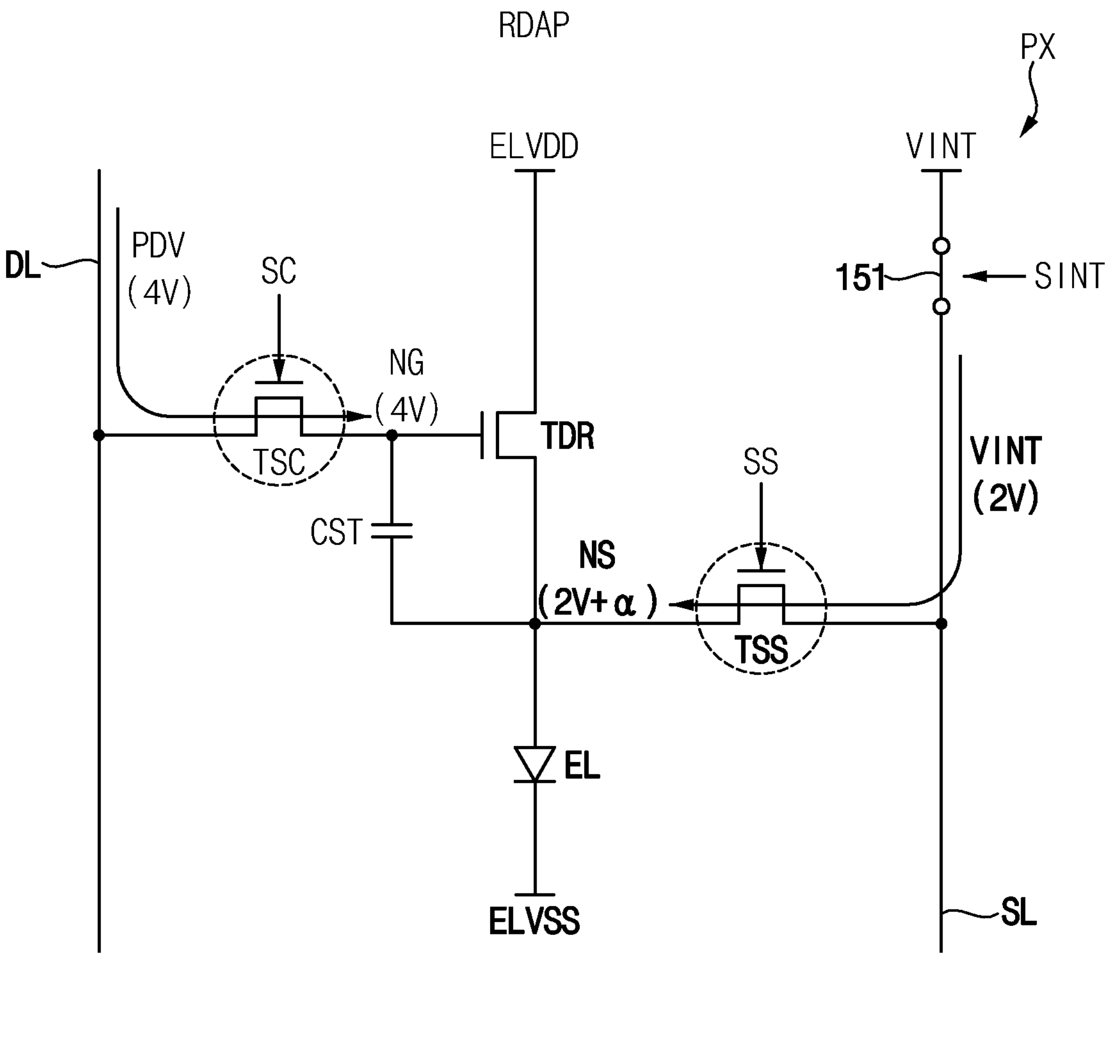
FIG. 12 is a circuit diagram for describing an example of an operation of a pixel in a recovery data application period.
Figure 13:
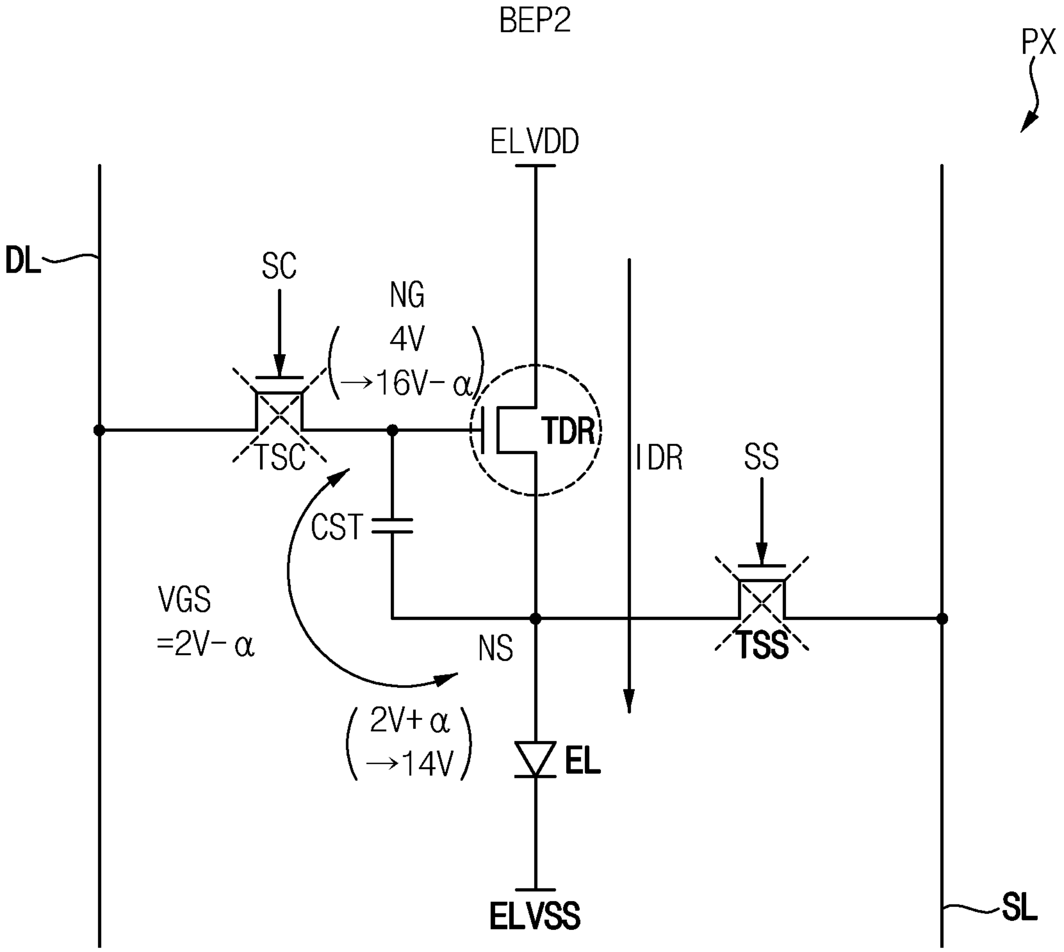
FIG. 13 is a circuit diagram for describing an example of an operation of a pixel in a blank emission period after a recovery data application period.

FIG. 4 is a flowchart illustrating a method of operating a display device according to embodiments. FIG. 5 is a timing diagram for describing an operation of a pixel on which a sensing operation is performed in a blank period in a display device according to embodiments. FIG. 6 is a circuit diagram for describing an example of an operation of a pixel in a data application period. FIG. 7 is a circuit diagram for describing an example of an operation of a pixel in an active period after a data application period. FIG. 8 is a circuit diagram for describing an example of an operation of a pixel in a sensing initialization period. FIG. 9 is a circuit diagram for describing an example of an operation of a pixel in a sensing period. FIG. 10 is a circuit diagram for describing an example of an operation of a pixel in a pre-charge data application period. FIG. 11 is a circuit diagram for describing an example of an operation of a pixel in a blank emission period after a pre-charge data application period. FIG. 12 is a circuit diagram for describing an example of an operation of a pixel in a recovery data application period. FIG. 13 is a circuit diagram for describing an example of an operation of a pixel in a blank emission period after a recovery data application period.

Referring to FIGS. 1, 4 and 5, a panel driver 120 may sequentially apply data voltages DV to pixels PX on a row basis in an active period AP of a frame period FP in an operation S310. For example, in the active period AP, a scan driver 130 may sequentially provide scan signals SC and sensing signals SS to the pixels PX on the row basis, and the data driver 140 may sequentially provide the data voltages DV to the pixels PX on the row basis.

For example, as illustrated in FIGS. 5 and 6, in a data application period DAP in which the data voltage DV is applied to the pixel PX within the active period AP, the scan signal SC may have an on-level, e.g., a high level, and the sensing signal SS may have the on-level. A scan transistor TSC may be turned on in response to the scan signal SC having the on-level, and may transfer the data voltage DV, e.g., of about 4V, of a data line DL to a gate node NG. In the active period AP, an initialization switch 151 may be turned on in response to an initialization signal SINT having the on-level, and may provide an initialization voltage VINT, e.g., of about 2V, to a sensing line SL. Further, a sensing transistor TSS may be turned on in response to the sensing signal SS having the on-level, and may transfer the initialization voltage VINT of the sensing line SL to a source node NS. After the data application period DAP, the gate node NG may have the data voltage DV of about 4V, the source node NS may have a voltage 2V+α where a certain voltage α is added to the initialization voltage VINT of about 2V, and a gate-source voltage of a driving transistor TDR may become about 2V−α.

As illustrated in FIGS. 5 and 7, in the active period AP after the data application period DAP, the scan signal SC for the pixel PX may have an off-level, e.g., a low level, and the sensing signal SS for the pixel PX may have the off-level. Thus, the scan transistor TSC may be turned off in response to the scan signal SC having the off-level, and the sensing transistor TSS may be turned off in response to the sensing signal SS having the off-level. Further, the driving transistor TDR may generate a driving current IDR based on the gate-source voltage of about 2V−α. Based on the driving current IDR, a parasitic capacitor of a light emitting element EL may be charged, and the voltage of the source node NS may be increased to a voltage, e.g., about 14V, greater than or equal to a threshold voltage, e.g., about 12V, of the light emitting element EL. If the voltage of the source node NS is increased to about 14V, a voltage of the gate node NG may be increased to about 16V−α, and the gate-source voltage of the driving transistor TDR may be maintained as 2V−α.

In a blank period BP of the frame period FP, the panel driver 120 may perform a sensing operation on at least one pixel PX in an operation S330. In some embodiments, the panel driver 120 may perform the sensing operation on one row of the pixels PX, e.g., sequentially or randomly selected, in the blank period BP of each frame period FP. Further, in some embodiments, as illustrated in FIG. 5, the blank period BP may include a sensing initialization period SIP, a sensing period SP, a pre-charge data application period CDAP, a first blank emission period BEP1, a recovery data application period RDAP and a second blank emission period BEP2.

For example, as illustrated in FIGS. 5 and 8, in the sensing initialization period SIP, a sensing data voltage SDV may be applied to the gate node NG, and the initialization voltage VINT may be applied to the source node NS. In the sensing initialization period SIP, the scan signal SC may have the on-level, the sensing signal SS may have the on-level, and a sampling signal SSAM may have the off-level. The scan transistor TSC may be turned on in response to the scan signal SC having the on-level, and may transfer the sensing data voltage SDV, e.g., of about 6V, of the data line DL to the gate node NG. Further, the sensing transistor TSS may be turned on in response to the sensing signal SS having the on-level, and may transfer the initialization voltage VINT of the sensing line SL to the source node NS. Thus, in the sensing initialization period SIP, the voltage of the gate node NG may become about 6V, and the voltage of the source node NS may become about 2V.

As illustrated in FIGS. 5 and 9, in the sensing period SP, a sensing operation may be performed. In the sensing period SP, the scan signal SC may have the off-level, the sensing signal SS may have the on-level, and the sampling signal SSAM may have the on-level. A sampling switch 152 may couple the sensing line SL to an ADC 153 in response to the sampling signal SSAM having the on-level. The scan transistor TSC may be turned off in response to the scan signal SC having the off-level. The sensing transistor TSS may be turned on in response to the sensing signal SS having the on-level, and may couple the source node NS to the sensing line SL. The driving transistor TDR may generate a sensing current ISEN based on the sensing data voltage SDV (or based on the gate-source voltage VGS of about 4V). A sensing circuit 150 of the panel driver 120 may sense the sensing current ISEN through the sensing line SL. In the sensing period SP, the voltage of the gate node NG and the voltage of the source node NS may be gradually increased. For example, in the sensing period SP, the voltage of the gate node NG may be increased from about 6V to about 8V, and the voltage of the source node NS may be increased from about 2V to about 4V.

The panel driver 120 may apply a pre-charge data voltage CDV to the pixel PX after the sensing operation within the blank period BP in an operation S350. In some embodiments, the pre-charge data voltage CDV may be higher than a maximum gray data voltage, e.g., the data voltage DV corresponding to a 255-gray level. For example, the maximum gray data voltage may be, but is not limited to, about 8V, and the pre-charge data voltage CDV may be, but is not limited to, about 10V.

For example, as illustrated in FIGS. 5 and 10, in the pre-charge data application period CDAP, the pre-charge data voltage CDV may be applied to the gate node NG, and the initialization voltage VINT may be applied to the source node NS. In the pre-charge data application period CDAP, the scan signal SC may have the on-level, the sensing signal SS may have the on-level, and the sampling signal SSAM may have the off-level. The scan transistor TSC may be turned on in response to the scan signal SC having the on-level, and may transfer the pre-charge data voltage CDV, e.g., of about 10V, of the data line DL to the gate node NG. Further, the sensing transistor TSS may be turned on in response to the sensing signal SS having the on-level, and may transfer the initialization voltage VINT of the sensing line SL to the source node NS. Thus, in the pre-charge data application period CDAP, the voltage of the gate node NG may become about 10V, and the voltage of the source node NS may become about 2V.

If the pre-charge data voltage CDV is applied to the pixel PX, the pixel PX may emit light during a predetermined time. That is, in some embodiments, the predetermined time may correspond to the first blank emission period BEP1 in which the pixel PX on which the sensing operation is performed emits light within the blank period BP. For example, as illustrated in FIGS. 5 and 11, in the first blank emission period BEP1, the light emitting element EL may emit light. In the first blank emission period BEP1, the scan signal SC may have the off-level, the sensing signal SS may have the off-level, and the sampling signal SSAM may have the off-level. The scan transistor TSC may be turned off in response to the scan signal SC having the off-level, and the sensing transistor TSS may be turned off in response to the sensing signal SS having the off-level. The driving transistor TDR may generate a driving current IDR based on the pre-charge data voltage CDV (or based on the gate-source voltage VGS of about 8V), and the light emitting element EL may emit light based on the driving current IDR. The voltage of the source node NS may be increased to the voltage, e.g., about 14V, greater than or equal to the threshold voltage, e.g., about 12V, of the light emitting element EL. The voltage of the gate node NG may be increased to about 22V as the voltage of the source node NS is increased. In some embodiments, the first blank emission period BEP1 may have a short time length, e.g., corresponding to about three horizontal times, and thus the light-emission of the pixel PX may not be perceived even if the pixel PX emits light with high luminance in the first blank emission period BEP1.

Within the blank period BP, the panel driver 120 may apply a previous data voltage PDV to the pixel PX after the predetermined time from a time point at which the pre-charge data voltage CDV is applied in an operation S370. In some embodiments, the previous data voltage PDV may be the data voltage DV that is applied to the pixel PX in the active period AP.

For example, as illustrated in FIGS. 5 and 12, in the recovery data application period RDAP, the previous data voltage PDV may be applied to the gate node NG, and the initialization voltage VINT may be applied to the source node NS. In the recovery data application period RDAP, the scan signal SC may have the on-level, the sensing signal SS may have the on-level, and the sampling signal SSAM may have the off-level. The scan transistor TSC may be turned on in response to the scan signal SS having the on-level, and may transfer the previous data voltage PDV, e.g., of about 4V, of the data line DL to the gate node NG. Further, the sensing transistor TSS may be turned on in response to the sensing signal SS having the on-level, and may transfer the initialization voltage VINT of the sensing line SL to the source node NS. Thus, in the recovery data application period RDAP, the voltage of the gate node NG may become about 4V. Further, since the voltage of the source node NS is about 14V in the first blank emission period BEP1 immediately before the recovery data application period RDAP, the source node NS may have the voltage $2V+\alpha$ where the certain voltage $\alpha$ is added to the initialization voltage VINT of about 2V in the recovery data application period RDAP. Thus, at an end time point of the recovery data application period RDAP, the driving transistor TDR may have the gate-source voltage of about 2V−α.

Accordingly, a voltage difference VGS between the voltage of the gate node NG and the voltage of the source node NS after the recovery data application period RDAP may be substantially the same as a voltage difference VGS between the voltage of the gate node NG and the voltage of the source node NS in the active period AP. For example, as illustrated in FIGS. 5 and 13, in the second blank emission period BEP2 after the recovery data application period RDAP, the driving transistor TDR may generate a driving current IDR based on the gate-source voltage of about 2V−α, and the light emitting element EL may emit light based on the driving current IDR.

As described above, in a method of operating the display device 100 according to embodiments, the gate-source voltage VGS of the driving transistor TDR of the pixel PX after the previous data voltage PDV is applied within the blank period BP may be substantially the same as the gate-source voltage VGS of the driving transistor TDR of the pixel PX in the active period AP. Accordingly, in the method of operating the display device 100 according to embodiments, luminance of the pixel PX on which the sensing operation is performed in the blank period BP may be prevented from being increased.

Figure 14:
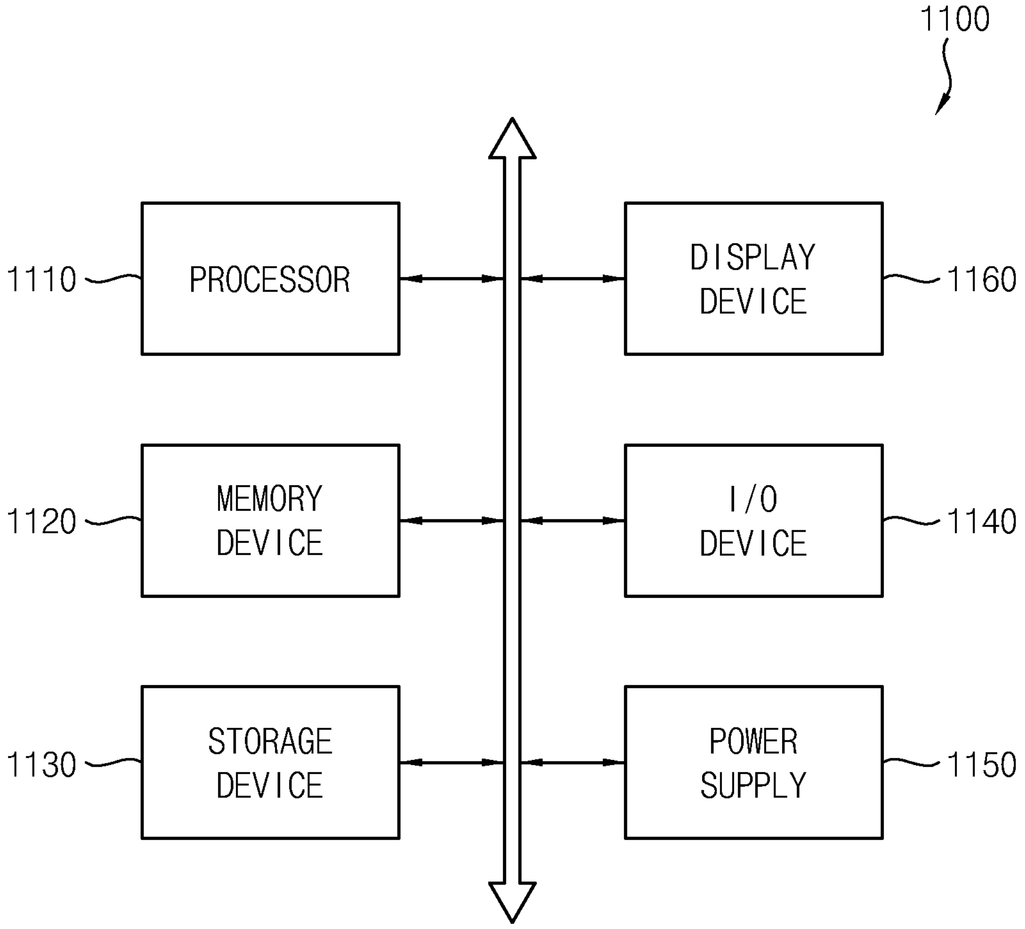
FIG. 14 is a block diagram illustrating an electronic device including a display device according to embodiments.

FIG. 14 is a block diagram illustrating an electronic device 1100 including a display device 1160 according to embodiments.

Referring to FIG. 14, the electronic device 1100 may include a processor 1110, a memory device 1120, a storage device 1130, an input/output (I/O) device 1140, a power supply 1150, and the display device 1160. The electronic device 1100 may further include a plurality of ports for communicating with a video card, a sound card, a memory card, a universal serial bus (USB) device, other electronic devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a pre-charge data voltage may be applied to a pixel after a sensing operation for the pixel is performed in a blank period of a frame period, and a previous data voltage may be applied to the pixel after a predetermined time from a time point at which the pre-charge data voltage is applied. Accordingly, luminance of the pixel on which the sensing operation is performed in the blank period may be prevented from being increased.

The inventive concepts may be applied to any electronic device 1100 including the display device 1160. For example, the inventive concepts may be applied to a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

Figure 15:
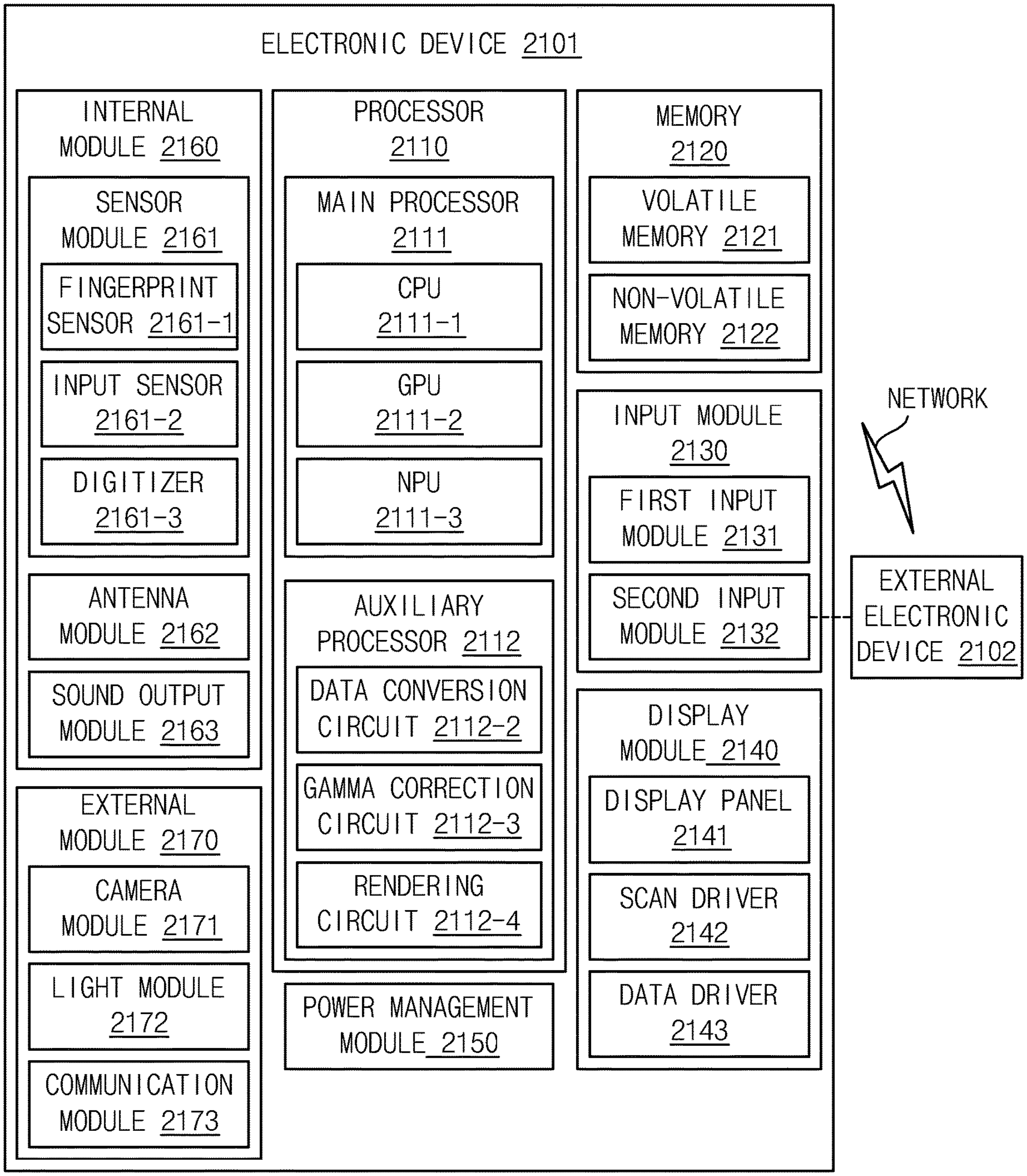
FIG. 15 is a block diagram illustrating an example of an electronic device according to embodiments.

FIG. 15 is a block diagram illustrating an example of an electronic device 2101 according to embodiments.

The electronic device 2101 may output various information via a display module 2140 in an operating system. When a processor 2110 executes an application stored in a memory 2120, the display module 2140 may provide application information to a user via a display panel 2141.

The processor 2110 may obtain an external input via an input module 2130 or a sensor module 2161 and may execute an application corresponding to the external input. For example, when the user selects a camera icon displayed on the display panel 2141, the processor 2110 may obtain a user input via an input sensor 2161-2 and may activate a camera module 2171. The processor 2110 may transfer image data corresponding to an image captured by the camera module 2171 to the display module 2140. The display module 2140 may display an image corresponding to the captured image via the display panel 2141.

As another example, when personal information authentication is executed in the display module 2140, a fingerprint sensor 2161-1 may obtain input fingerprint information as input data. The processor 2110 may compare the input data obtained by the fingerprint sensor 2161-1 with authentication data stored in the memory 2120, and may execute an application according to the comparison result. The display module 2140 may display information executed according to application logic via the display panel 2141.

As still another example, when a music streaming icon displayed on the display module 2140 is selected, the processor 2110 obtains a user input via the input sensor 2161-2 and may activate a music streaming application stored in the memory 2120. When a music execution command is input in the music streaming application, the processor 2110 may activate a sound output module 2163 to provide sound information corresponding to the music execution command to the user.

In the above, an operation of the electronic device 2101 has been briefly described. Hereinafter, a configuration of the electronic device 2101 will be described in detail. Some components of the electronic device 2101 described below may be integrated and provided as one component, or one component may be provided separately as two or more components.

Referring to FIG. 15, the electronic device 2101 may communicate with an external electronic device 2102 via a network, e.g., a short-range wireless communication network or a long-range wireless communication network. In some embodiments, the electronic device 2101 may include the processor 2110, the memory 2120, the input module 2130, the display module 2140, a power management module 2150, an internal module 2160 and an external module 2170. In some embodiments, at least one of the components may be omitted from the electronic device 2101, or one or more other components may be added in the electronic device 2101. In some embodiments, some of the components, e.g., the sensor module 2161, an antenna module 2162, or the sound output module 2163, may be implemented as a single component, e.g., the display module 2140.

The processor 2110 may execute software to control at least one other component, e.g., a hardware or software component, of the electronic device 2101 coupled with the processor 2110, and may perform various data processing or computation. According to some embodiments, as at least part of the data processing or computation, the processor 2110 may store a command or data received from another component, e.g., the input module 2130, the sensor module 2161 or a communication module 2173, in a volatile memory 2121, may process the command or the data stored in the volatile memory 2121, and may store resulting data in a non-volatile memory 2122.

The processor 2110 may include a main processor 2111 and an auxiliary processor 2112. The main processor 2111 may include one or more of a central processing unit (CPU) 2111-1 or an application processor (AP). The main processor 2111 may further include any one or more of a graphics processing unit (GPU) 2111-2, a communication processor (CP), and an image signal processor (ISP). The main processor 2111 may further include a neural processing unit (NPU) 2111-3. The NPU 2111-3 may be a processor specialized in processing an artificial intelligence model, and the artificial intelligence model may be generated through machine learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than a hardware structure. At least two of the above-described processing units and processors may be implemented as an integrated component, e.g., a single chip, or respective processing units and processors may be implemented as independent components, e.g., a plurality of chips.

The auxiliary processor 2112 may include a controller. The controller may include an interface conversion circuit and a timing control circuit. The controller may receive an image signal from the main processor 2111, may convert a data format of the image signal to meet interface specifications with the display module 2140, and may output image data. The controller may output various control signals required for driving the display module 2140.

The auxiliary processor 2112 may further include a data conversion circuit 2112-2, a gamma correction circuit 2112-3, a rendering circuit 2112-4, or the like. The data conversion circuit 2112-2 may receive image data from the controller. The data conversion circuit 2112-2 may compensate for the image data such that an image is displayed with a desired luminance according to characteristics of the electronic device 2101 or the user's setting, or may convert the image data to reduce power consumption or to eliminate an after-image. The gamma correction circuit 2112-3 may convert image data or a gamma reference voltage so that an image displayed on the electronic device 2101 has desired gamma characteristics. The rendering circuit 2112-4 may receive image data from the controller, and may render the image data in consideration of a pixel arrangement of the display panel 2141 in the electronic device 2101. At least one of the data conversion circuit 2112-2, the gamma correction circuit 2112-3 and the rendering circuit 2112-4 may be integrated in another component, e.g., the main processor 2111 or the controller. At least one of the data conversion circuit 2112-2, the gamma correction circuit 2112-3 and the rendering circuit 2112-4 may be integrated in a data driver 2143 described below.

The memory 2120 may store various data used by at least one component, e.g., the processor 2110 or the sensor module 2161, of the electronic device 2101. The various data may include, for example, input data or output data for a command related thereto. The memory 2120 may include at least one of the volatile memory 2121 and the non-volatile memory 2122.

The input module 2130 may receive a command or data to be used by the components, e.g., the processor 2110, the sensor module 2161, or the sound output module 2163, of the electronic device 2101 from the outside of the electronic device 2101, e.g., the user or the external electronic device 2102.

The input module 2130 may include a first input module 2131 for receiving a command or data from the user, and a second input module 2132 for receiving a command or data from the external electronic device 2102. The first input module 2131 may include a microphone, a mouse, a keyboard, a key, e.g., a button, or a pen, e.g., a passive pen or an active pen. The second input module 2132 may support a designated protocol capable of connecting the electronic device 2101 to the external electronic device 2102 by wire or wirelessly. In some embodiments, the second input module 2132 may include a high definition multimedia interface (HDMI), a universal serial bus (USB) interface, an SD card interface or an audio interface. The second input module 2132 may include a connector that may physically connect the electronic device 2101 to the external electronic device 2102. For example, the second input module 2132 may include an HDMI connector, a USB connector, an SD card connector or an audio connector, e.g., a headphone connector.

The display module 2140 may visually provide information to the user. The display module 2140 may include the display panel 2141, a scan driver 2142 and the data driver 2143. The display module 2140 may further include a window, a chassis and a bracket for protecting the display panel 2141.

The display panel 2141 may include a liquid crystal display panel, an organic light emitting display panel or an inorganic light emitting display panel, but the type of the display panel 2141 is not limited thereto. The display panel 2141 may be a rigid type display panel, or a flexible type display panel capable of being rolled or folded. The display module 2140 may further include a supporter, a bracket or a heat dissipation member that supports the display panel 2141.

The scan driver 2142 may be mounted on the display panel 2141 as a driving chip. Alternatively, the scan driver 2142 may be integrated into the display panel 2141. For example, the scan driver 2142 may include an amorphous silicon TFT gate driver circuit (ASG), a low temperature polycrystalline silicon (LTPS) TFT gate driver circuit or an oxide semiconductor TFT gate driver circuit (OSG) embedded in the display panel 2141. The scan driver 2142 may receive a control signal from the controller and may output scan signals to the display panel 2141 in response to the control signal.

The display panel 2141 may further include an emission driver. The emission driver may output an emission control signal to the display panel 2141 in response to a control signal received from the controller. The emission driver may be formed separately from the scan driver 2142, or may be integrated into the scan driver 2142.

The data driver 2143 may receive a control signal from the controller, may convert image data into analog voltages, e.g., data voltages, in response to the control signal, and then may output the data voltages to the display panel 2141.

The data driver 2143 may be incorporated into other components, e.g., the controller. Further, the functions of the interface conversion circuit and the timing control circuit of the controller described above may be integrated into the data driver 2143.

The display module 2140 may further include the emission driver, a voltage generator circuit, or the like. The voltage generator circuit may output various voltages used to drive the display panel 2141.

The power management module 2150 may supply power to the components of the electronic device 2101. The power management module 2150 may include a battery that charges a power supply voltage. The battery may include a primary cell which is not rechargeable, a secondary cell which is rechargeable, or a fuel cell. The power management module 2150 may include a power management integrated circuit (PMIC). The PMIC may supply optimal power to each of the modules described above and modules described below. The power management module 2150 may include a wireless power transmission/reception member electrically connected to the battery. The wireless power transmission/reception member may include a plurality of antenna radiators in the form of coils.

The electronic device 2101 may further include the internal module 2160 and the external module 2170. The internal module 2160 may include the sensor module 2161, the antenna module 2162 and the sound output module 2163. The external module 2170 may include the camera module 2171, a light module 2172 and the communication module 2173.

The sensor module 2161 may detect an input by the user's body or an input by the pen of the first input module 2131, and may generate an electrical signal or data value corresponding to the input. The sensor module 2161 may include at least one of the fingerprint sensor 2161-1, the input sensor 2161-2 and a digitizer 2161-3.

The fingerprint sensor 2161-1 may generate a data value corresponding to the user's fingerprint. The fingerprint sensor 2161-1 may include any one of an optical type fingerprint sensor and a capacitive type fingerprint sensor.

The input sensor 2161-2 may generate a data value corresponding to coordinate information of the user's body input or the pen input. The input sensor 2161-2 may convert a capacitance change caused by the input into the data value. The input sensor 2161-2 may detect the input by the passive pen, or may transmit/receive data to/from the active pen.

The input sensor 2161-2 may measure a bio-signal, such as blood pressure, moisture or body fat. For example, when a portion of the body of the user touches a sensor layer or a sensing panel, and does not move for a certain period of time, the input sensor 2161-2 may output information desired by the user to the display module 2140 by detecting the bio-signal based on a change in electric field due to the portion of the body.

The digitizer 2161-3 may generate a data value corresponding to coordinate information of the input by the pen. The digitizer 2161-3 may convert an amount of an electromagnetic change caused by the input into the data value. The digitizer 2161-3 may detect the input by the passive pen, or may transmit/receive data to/from the active pen.

At least one of the fingerprint sensor 2161-1, the input sensor 2161-2 and the digitizer 2161-3 may be implemented as a sensor layer formed on the display panel 2141 through a continuous process. The fingerprint sensor 2161-1, the input sensor 2161-2 and the digitizer 2161-3 may be disposed above the display panel 2141, or at least one of the fingerprint sensor 2161-1, the input sensor 2161-2 and the digitizer 2161-3 may be disposed below the display panel 2141.

Two or more of the fingerprint sensor 2161-1, the input sensor 2161-2 and the digitizer 2161-3 may be integrated into one sensing panel through the same process. When integrated into one sensing panel, the sensing panel may be disposed between the display panel 2141 and a window disposed above the display panel 2141. In some embodiments, the sensing panel may be disposed on the window, but the location of the sensing panel is not limited thereto.

At least one of the fingerprint sensor 2161-1, the input sensor 2161-2 and the digitizer 2161-3 may be embedded in the display panel 2141. In other words, at least one of the fingerprint sensor 2161-1, the input sensor 2161-2 and the digitizer 2161-2 may be simultaneously formed through a process of forming elements, e.g., light emitting elements, transistors, etc., included in the display panel 2141.

In addition, the sensor module 2161 may generate an electrical signal or a data value corresponding to an internal state or an external state of the electronic device 2101. The sensor module 2161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor or an illuminance sensor.

The antenna module 2162 may include one or more antennas for transmitting or receiving a signal or power to or from the outside. In some embodiments, the communication module 2173 may transmit or receive a signal to or from the external electronic device 2102 through an antenna suitable for a communication method. An antenna pattern of the antenna module 2162 may be integrated into one component, e.g., the display panel 2141, of the display module 2140 or the input sensor 2161-2.

The sound output module 2163 may output sound signals to the outside of the electronic device 2101. The sound output module 2163 may include, for example, a speaker or a receiver. The speaker may be used for general purposes, such as playing multimedia or playing a recording. The receiver may be used for receiving incoming calls. In some embodiments, the receiver may be implemented as separate from, or as part of the speaker. A sound output pattern of the sound output module 2163 may be integrated into the display module 2140.

The camera module 2171 may capture a still image and a moving image. In some embodiments, the camera module 2171 may include one or more lenses, an image sensor or an image signal processor. The camera module 2171 may further include an infrared camera capable of measuring the presence or absence of the user, the user's location and the user's line of sight.

The light module 2172 may provide light. The light module 2172 may include a light emitting diode or a xenon lamp. The light module 2172 may operate in conjunction with the camera module 2171, or may operate independently of the camera module 2171.

The communication module 2173 may support establishing a wired or wireless communication channel between the electronic device 2101 and the external electronic device 2102 and performing communication via the established communication channel. The communication module 2173 may include a wireless communication module, e.g., a cellular communication module, a short-range wireless communication module or a global navigation satellite system (GNSS) communication module, or a wired communication module, e.g., a local area network (LAN) communication module or a power line communication (PLC) module. The communication module 2173 may communicate with the external electronic device 2102 via a short-range communication network, e.g., Bluetooth™, wireless-fidelity (Wi-Fi) direct, or infrared data association (IrDA), or a long-range communication network, e.g., a cellular network, the Internet or a computer network, e.g., LAN or wide area network (WAN). These various types of communication modules 2173 may be implemented as a single chip, or may be implemented as multi-chips separate from each other.

The input module 2130, the sensor module 2161, the camera module 2171, and the like may be used to control an operation of the display module 2140 in conjunction with the processor 2110.

The processor 2110 may output a command or data to the display module 2140, the sound output module 2163, the camera module 2171 or the light module 2172 based on input data received from the input module 2130. For example, the processor 2110 may generate image data corresponding to input data applied through a mouse or an active pen, and may output the image data to the display module 2140. Alternatively, the processor 2110 may generate command data corresponding to the input data, and may output the command data to the camera module 2171 or the light module 2172. When no input data is received from the input module 2130 for a certain period of time, the processor 2110 may switch an operation mode of the electronic device 2101 to a low power mode or a sleep mode, thereby reducing power consumption of the electronic device 2101.

The processor 2110 may output a command or data to the display module 2140, the sound output module 2163, the camera module 2171 or the light module 2172 based on sensing data received from the sensor module 2161. For example, the processor 2110 may compare authentication data applied by the fingerprint sensor 2161-1 with authentication data stored in the memory 2120, and then may execute an application according to the comparison result. The processor 2110 may execute a command or output corresponding image data to the display module 2140 based on the sensing data sensed by the input sensor 2161-2 or the digitizer 2161-3. In a case where the sensor module 2161 includes a temperature sensor, the processor 2110 may receive temperature data from the sensor module 2161, and may further perform luminance correction on the image data based on the temperature data.

The processor 2110 may receive measurement data about the presence or absence of the user, the location of the user and the user's line of sight from the camera module 2171. The processor 2110 may further perform luminance correction on the image data based on the measurement data. For example, after the processor 2110 determines the presence or absence of the user based on the input from the camera module 2171, the data conversion circuit 2112-2 or the gamma correction circuit 2112-3 may perform the luminance correction on the image data, and the processor 2110 may provide the luminance-corrected image data to the display module 2140.

At least some of the above-described components may be coupled mutually and communicate signals, e.g., commands or data, therebetween via an inter-peripheral communication scheme, e.g., a bus, general purpose input and output (GPIO), serial peripheral interface (SPI), mobile industry processor interface (MIPI) or ultra-path interconnect (UPI). The processor 2110 may communicate with the display module 2140 via an agreed interface. Further, any one of the above-described communication methods may be used between the processor 2110 and the display module 2140, but the communication method between the processor 2110 and the display module 2140 is not limited to the above-described communication method.

The electronic device 2101 according to various embodiments described above may be various types of devices. For example, the electronic device 2101 may include at least one of a portable communication device, e.g., a smart phone, a computer device, a portable multimedia device, a portable medical device, a camera, a wearable device and a home appliance. However, the electronic device 2101 according to embodiments is not limited to the above-described devices.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. An electronic device comprising:

a processor configured to provide input image data; and a display device configured to receive the input image data from the processor, and to display an image based on the input image data, the display device comprising:

a display panel including pixels; and a panel driver configured to sequentially apply data voltages to the pixels on a row basis in an active period of a frame period, and to perform a sensing operation on at least one pixel of the pixels in a blank period of the frame period, wherein, within the blank period, the panel driver applies a pre-charge data voltage to the at least one pixel after the sensing operation, and applies a previous data voltage to the at least one pixel after a predetermined time from a time point at which the pre-charge data voltage is applied, wherein the pre-charge data voltage is higher than a maximum gray data voltage.

2. The electronic device of claim 1, wherein a gate-source voltage of a driving transistor of the at least one pixel after the previous data voltage is applied within the blank period is equal to a gate-source voltage of the driving transistor of the at least one pixel in the active period.

3. The electronic device of claim 1, wherein the predetermined time corresponds to a blank emission period in which the at least one pixel emits light within the blank period.

4. The electronic device of claim 1, wherein the previous data voltage is a data voltage that is applied to the at least one pixel in the active period.

5. The electronic device of claim 1, wherein the at least one pixel includes:

a driving transistor including a gate coupled to a gate node, a first terminal coupled to a line having a first power supply voltage, and a second terminal coupled to a source node;

a scan transistor including a gate receiving a scan signal, a first terminal coupled to a data line, and a second terminal coupled to the gate node;

a sensing transistor including a gate receiving a sensing signal, a first terminal coupled to a sensing line, and a second terminal coupled to the source node;

a storage capacitor including a first electrode coupled to the gate node, and a second electrode coupled to the source node; and a light emitting element including an anode coupled to the source node, and a cathode coupled to a line having a second power supply voltage.

6. The electronic device of claim 5, wherein, within the predetermined time, the driving transistor is turned on, and a voltage of the source node is increased to a voltage greater than or equal to a threshold voltage of the light emitting element.

7. The electronic device of claim 5, wherein, within the predetermined time, a parasitic capacitor of the light emitting element is charged.

8. The electronic device of claim 5, wherein the blank period includes:

a sensing initialization period in which a sensing data voltage is applied to the gate node, and an initialization voltage is applied to the source node;

a sensing period in which the sensing operation is performed;

a pre-charge data application period in which the pre-charge data voltage is applied to the gate node, and the initialization voltage is applied to the source node;

a blank emission period in which the light emitting element emits light; and a recovery data application period in which the previous data voltage is applied to the gate node, and the initialization voltage is applied to the source node.

9. The electronic device of claim 8, wherein, in the sensing initialization period, the scan signal has an on-level, and the sensing signal has the on-level, the scan transistor is turned on in response to the scan signal having the on-level, and transfers the sensing data voltage of the data line to the gate node, and the sensing transistor is turned on in response to the sensing signal having the on-level, and transfers the initialization voltage of the sensing line to the source node.

10. The electronic device of claim 8, wherein, in the sensing period, the scan signal has an off-level, and the sensing signal has an on-level, the scan transistor is turned off in response to the scan signal having the off-level, the sensing transistor is turned on in response to the sensing signal having the on-level, and couples the source node to the sensing line, the driving transistor generates a sensing current based on the sensing data voltage, and the panel driver senses the sensing current through the sensing line.

11. The electronic device of claim 8, wherein, in the pre-charge data application period, the scan signal has an on-level, and the sensing signal has the on-level, the scan transistor is turned on in response to the scan signal having the on-level, and transfers the pre-charge data voltage of the data line to the gate node, and the sensing transistor is turned on in response to the sensing signal having the on-level, and transfers the initialization voltage of the sensing line to the source node.

12. The electronic device of claim 8, wherein, in the blank emission period, the scan signal has an off-level, and the sensing signal has the off-level, the scan transistor is turned off in response to the scan signal having the off-level, the sensing transistor is turned off in response to the sensing signal having the off-level, the driving transistor generates a driving current based on the pre-charge data voltage, a voltage of the source node is increased to a voltage greater than or equal to a threshold voltage of the light emitting element, and a voltage of the gate node is increased as the voltage of the source node is increased.

13. The electronic device of claim 8, wherein, in the recovery data application period, the scan signal has an on-level, and the sensing signal has the on-level, the scan transistor is turned on in response to the scan signal having the on-level, and transfers the previous data voltage of the data line to the gate node, and the sensing transistor is turned on in response to the sensing signal having the on-level, and transfers the initialization voltage of the sensing line to the source node.

14. The electronic device of claim 8, wherein a voltage difference between a voltage of the gate node and a voltage of the source node after the recovery data application period is equal to a voltage difference between the voltage of the gate node and the voltage of the source node in the active period.

15. A method of operating a display device, the method comprising:

sequentially applying data voltages to pixels on a row basis in an active period of a frame period;

performing a sensing operation on at least one pixel of the pixels in a blank period of the frame period;

applying a pre-charge data voltage to the at least one pixel after the sensing operation within the blank period; and applying a previous data voltage to the at least one pixel after a predetermined time from a time point at which the pre-charge data voltage is applied within the blank period, wherein the predetermined time corresponds to a blank emission period in which the at least one pixel emits light within the blank period.

16. The method of claim 15, wherein a gate-source voltage of a driving transistor of the at least one pixel after the previous data voltage is applied within the blank period is equal to a gate-source voltage of the driving transistor of the at least one pixel in the active period.

17. The method of claim 15, wherein the pre-charge data voltage is higher than a maximum gray data voltage.

18. The method of claim 15, wherein the previous data voltage is a data voltage that is applied to the at least one pixel in the active period.

* * * * *